United States Patent
Kwasiborski et al.

(10) Patent No.: US 11,594,228 B2
(45) Date of Patent: Feb. 28, 2023

(54) HEARING DEVICE OR SYSTEM COMPRISING A USER IDENTIFICATION UNIT

(71) Applicant: Oticon A/S, Smørum (DK)

(72) Inventors: Sławomir Kwasiborski, Warsaw (PL); Morten Guld, Smørum (DK); Svend Oscar Petersen, Smørum (DK); Michael Syskind Pedersen, Smørum (DK); Christophe Lesimple, Berne (CH)

(73) Assignee: Oticon A/S, Smørum (DK)

( * ) Notice: Subject to any disclaimer, the term of this patent is extended or adjusted under 35 U.S.C. 154(b) by 214 days.

(21) Appl. No.: 16/818,890

(22) Filed: Mar. 13, 2020

(65) Prior Publication Data

US 2020/0294508 A1 Sep. 17, 2020

(30) Foreign Application Priority Data

Mar. 13, 2019 (EP) ..................................... 19162639

(51) Int. Cl.
*G10L 17/00* (2013.01)
*G10L 17/18* (2013.01)
*H04R 25/00* (2006.01)

(52) U.S. Cl.
CPC ............... *G10L 17/00* (2013.01); *G10L 17/18* (2013.01); *H04R 25/405* (2013.01); *H04R 25/43* (2013.01);
(Continued)

(58) Field of Classification Search
CPC ......... G06F 21/32; G10L 17/00; G10L 17/18; H04R 2203/12; H04R 2225/41; H04R 25/405; H04R 25/43; H04R 25/505
(Continued)

(56) References Cited

U.S. PATENT DOCUMENTS 9,992,587 B2 * 6/2018 Farmani ............... H04R 25/505
10,219,083 B2 * 2/2019 Farmani ............... H04R 25/552
(Continued)

FOREIGN PATENT DOCUMENTS

EP    3 328 097 A1    5/2018
EP    3 588 981 A1    1/2020
(Continued)

*Primary Examiner* — Stella L. Woo
(74) *Attorney, Agent, or Firm* — Birch, Stewart, Kolasch & Birch, LLP

(57) ABSTRACT

A hearing system comprises a hearing device, e.g. a hearing aid, configured to be worn by a particular user at or in an ear, or to be fully or partially implanted in the head at an ear of the user. The hearing device comprises at least one microphone for converting a sound in the environment of the hearing device to an electric input signal. The hearing system, e.g. the hearing device, comprises a processor comprising an own voice analyzer configured to characterize the voice of a person presently wearing the hearing device based at least partly on said electric input signal, and to provide characteristics of said person's voice, and an own voice acoustic channel analyzer for estimating characteristics of an acoustic channel from the mouth of the person presently wearing the hearing device to the at least one microphone based at least partly on said electric input signal, and to provide characteristics of said acoustic channel of said person. The hearing system further comprises a user identification unit configured to provide a user identification signal indicating whether or not, or with what probability, the person currently wearing the hearing device is said particular user in dependence of said characteristics of said person's voice and said characteristics of said acoustic channel of said person.

20 Claims, 21 Drawing Sheets

(52) U.S. Cl.
CPC ...... *H04R 2203/12* (2013.01); *H04R 2225/41* (2013.01)

(58) Field of Classification Search
USPC .......................................................... 704/246
See application file for complete search history.

(56) References Cited

U.S. PATENT DOCUMENTS

| | | | |
|---|---|---|---|
| 2011/0237295 A1* | 9/2011 | Bartkowiak | H04R 25/505 |
| | | | 455/556.1 |
| 2015/0230036 A1* | 8/2015 | Pedersen | H04R 25/305 |
| | | | 381/330 |
| 2017/0092269 A1* | 3/2017 | Haubrich | H04R 25/554 |
| 2017/0116995 A1* | 4/2017 | Ady | H04W 12/06 |
| 2018/0041849 A1* | 2/2018 | Farmani | H04R 25/405 |
| 2018/0054683 A1* | 2/2018 | Pedersen | H04R 25/554 |
| 2018/0232511 A1* | 8/2018 | Bakish | G06F 21/32 |
| 2018/0262849 A1* | 9/2018 | Farmani | H04R 3/005 |
| 2019/0090071 A1* | 3/2019 | Mazzucchi | G06F 21/31 |
| 2020/0294508 A1* | 9/2020 | Kwasiborski | H04R 25/405 |

FOREIGN PATENT DOCUMENTS

| | | |
|---|---|---|
| WO | WO 2017/205558 A1 | 11/2017 |
| WO | WO 2017/205558 A9 | 11/2017 |

\* cited by examiner

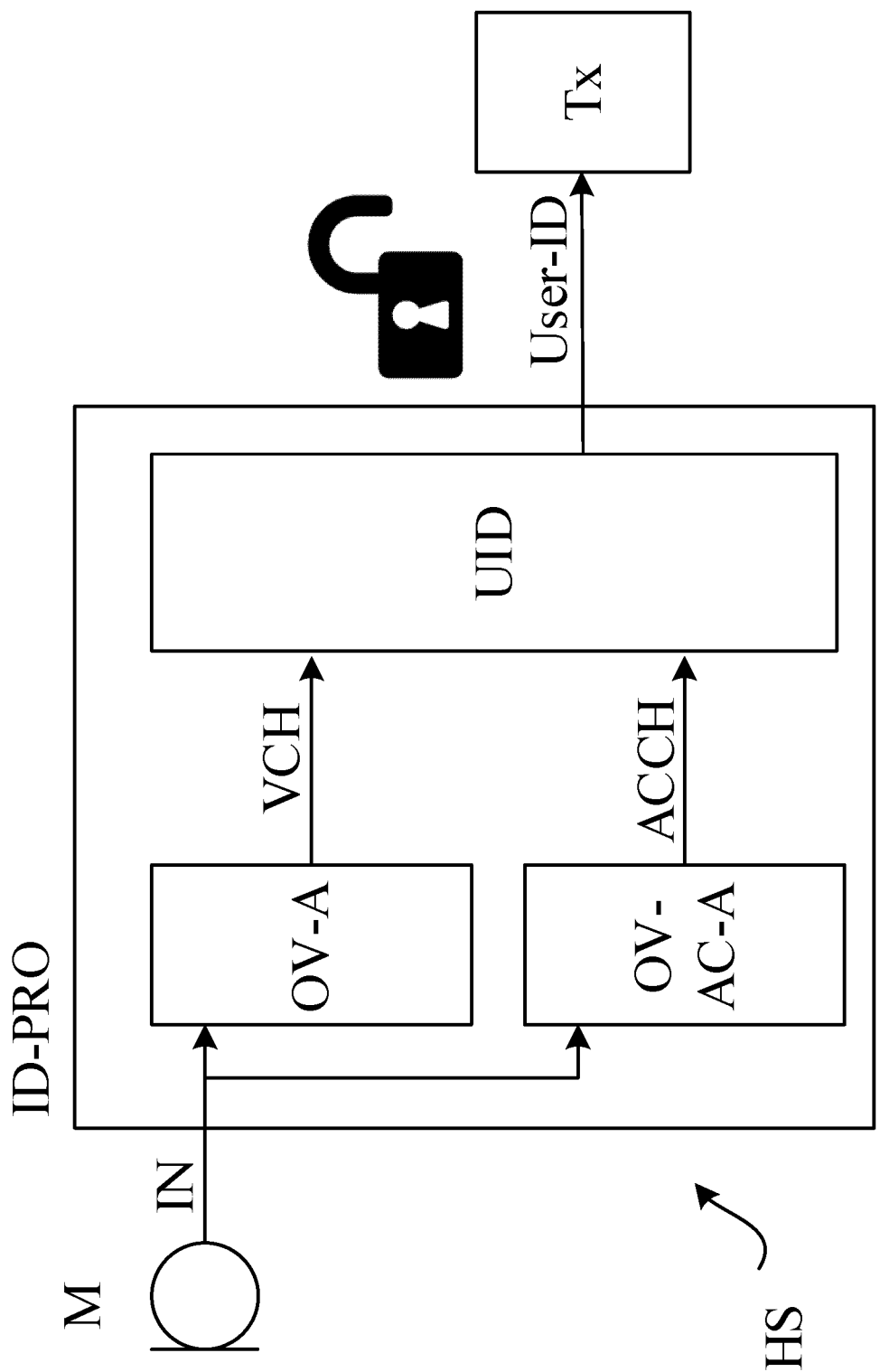

HEARING DEVICE OR SYSTEM COMPRISING A USER IDENTIFICATION UNIT

SUMMARY

The present application relates to hearing devices, e.g. hearing aids or headsets or ear buds, comprising a user identification and/or authentication unit.

Safe identification of a person is important in many applications. A biometric identification (or other safe identification of a particular user) may e.g. replace the need for passwords and ease the user's access to devices or services. Biometric identification may e.g. be utilized for unlocking a smartphone, for identification/authentication using (electronic) payments/transactions or as replacement or in addition to keys for cars or the home, a headset of a call center or other restricted use-application, etc.

A Hearing System Comprising a Hearing Device:

Voice interfaces to electronic devices are of increasing interest due to their (in principle) ease of use. For some users of hearing devices, ease of use is of prime importance, e.g. to avoid more complicated user interfaces such as buttons or remote controls, e.g. APPs of smartphones. For some applications, identification of the particular user operating the voice interface is crucial. A particular user can be identified by means of the user's voice (e.g. by certain characteristics of the voice, such as pitch, etc., or using a trained model, e.g. a neural network). To do it safely (with a high probability of being correct) may be computationally challenging, however.

A user's physiognomy (e.g. facial characteristics, e.g. dimensions and form, characteristics of the ear(s)) may be reflected via appropriate acoustic transfer functions from a sound source to the user's ear(s). The sound source may e.g. be the user's mouth (voice). The sound source may e.g. be a loudspeaker of the hearing device.

It is proposed to provide a hearing device adapted to a particular user and configured to provide a user identification signal indicating whether or not a person currently wearing the hearing device is said particular user,(biometric identification). The hearing, device (and/or a device in communication with the hearing device, e.g. a smartphone) comprises a processor configured to provide said identification signal based on a combination of 1) identification of characteristics of the user's voice, and 2) identification of another parameter characteristic of the current user of the hearing device.

Another parameter, characteristic of the current user of the hearing device, may be an acoustic transfer function (or impulse response) from the user's mouth to the hearing device (e.g. to one or more microphones of the hearing device). Another parameter, characteristic of the current user of the hearing device, may be an acoustic transfer function (or impulse response) from a loudspeaker to the hearing device (e.g. to one or more microphones of the hearing device, i.e. a feedback transfer function).

In the present context, the term 'microphone' (unless specifically stated) is intended to mean an acoustic to electric transducer that converts air-borne vibrations to an electric signal. In other words, 'microphone' is not intended to cover underwater microphones ('hydrophones') of acoustic transducers for picking up surface acoustic waves of vibrations in solid matter (e.g. bone conduction).

The hearing system, e.g. the hearing device, may comprise a vibration sensor, e.g. an accelerometer, for sensing bone vibration in the user's scull. Another parameter, characteristic of the current user of the hearing device, may be based on an output signal from the vibration sensor.

Another parameter, characteristic of the current user of the hearing device, may be a non-acoustic parameter, e.g. a heartbeat (e.g. measured with a microphone or a pulse-sensor, e.g. a PPG sensor).

A microphone of the hearing system, e.g. of the hearing device, may e.g. be located at or in an ear of the user. A microphone may e.g. be located at or in an ear canal of the user. A microphone may e.g. be located in an ear canal of the user facing the ear drum. A microphone may e.g. be located at or behind pinna. A microphone may e.g. be located in concha or elsewhere in the same side of pinna.

In an aspect, a hearing device adapted to a particular user is configured to provide a user identification signal, the user identification signal being based on characteristics of a voice of the user currently wearing the hearing device and on a parameter (or parameters) of the acoustic system constituted by the hearing device when worn by said user, and on measured or otherwise identified characteristics of a voice and said parameter(s) of the acoustic system of said particular user. The hearing device is brought into a 'user identification' (or 'authorizing') mode, when said user identification signal indicates a match with the particular user.

In an aspect, a hearing device adapted to a particular user is configured to provide a user identification signal for enabling or disabling an authorizing mode based at least partly on a parameter of an acoustic system constituted by the hearing device when worn by a current user. Enablement and/or disablement of an authorization mode may comprise the identification of a specific keyword or key sentence spoken by the particular user (e.g. 'start' and 'stop', respectively, or 'start user ID' and 'stop user ID', respectively).

The hearing device may be configured to continuously (or repeatedly) determine (e.g. recalculate) the user identification signal (also when the authorizing mode has been entered), e.g. every time a user's voice is identified (e.g. by an own voice detector, e.g. of the hearing device). The hearing device may be configured to stay in the authorizing mode until a) either the user identification signal does not indicate a match with the particular user's identity, or 2) until a request from the user (e.g. via a user interface) is received by the hearing device, or 3) until a particular termination criterion is fulfilled (e.g. if a parameter indicates that the hearing device (or devices) is (are) no longer mounted (operationally as intended) on the user's head, e.g. as detected by one or more sensors, e.g. a movement sensor, a feedback detector, a wireless link quality measure, a proximity sensor, a pulse sensor, etc.).

To avoid abuse of a hearing device in an authorizing mode, wherein a user identification signal indicates a match with a particular user of the hearing device, and wherein the user identification signal can be used to verify (authorize) the identity the particular user, a scheme for terminating an authorizing mode is preferably implemented. In an aspect, a method of terminating an authorizing mode of a hearing device is provided. The method of terminating an authorizing mode may be different from the method of initiating (entering) an authorizing mode.

In an aspect, a method of terminating an authorizing mode of a hearing device is provided. A termination criterion may e.g. rely on monitoring the acoustic system, e.g. the parameter(s) of the acoustic system, e.g. a feedback estimate, in particular on identifying a sudden change (larger than a (e.g. predefined) minimum size). The method of terminating an authorizing mode may be based on an estimate of a feedback path of the hearing device from an output transducer to an input transducer of the hearing device. A feedback path typically changes dramatically (and instantaneously), when a hearing device is removed from its normal operational location (at an ear of a user). A feedback estimate of a feedback control system of a hearing device is typically 'continuously' updated, e.g. every 1 ms or more often. If, e.g., a change of the feedback estimate changes towards a feedback path indicating that the hearing instrument is no longer mounted at the ear (e.g. at one or more frequencies, e.g. a change is larger than a threshold value), the authorizing mode may be terminated. Subsequently a new authentication process must be initiated, and successfully completed, to bring the hearing device into the authorizing mode again. Alternatively or additionally, a substantial change (larger than a threshold) of a transfer function of an interaural wireless transfer function of a hearing device forming part of a binaural hearing system may be used to indicate a significant change of the acoustic characteristics of the hearing system (e.g. a removal from the head of (at least one of) the hearing devices). In US20150230036A1 various methods of identifying cues to detect whether or not the hearing device, e.g. a hearing aid, is mounted on the head of a user are described. The identification is typically based on a movement sensor, e.g. an accelerometer, e.g. correlating the accelerometer sensor signals binaurally (as movement pattern as well as direction of gravity should be correlated, when both instruments are mounted). The identification may be based on a pulse sensor.

The hearing device may preferably be configured to issue a user identification status to the wearer of the hearing device, e.g. as an acoustic indicator (e.g. a spoken message) via an output unit of the hearing device, and/or via a user interface. Such user identification status message may e.g. indicate that an authorization mode has been entered (or terminated), cf. e.g. FIG. 9B.

The user identification may e.g. be based on a binaural decision (based on user identification signals from hearing devices located at left and right ears of the user, or based on voice characteristics and/or acoustic system characteristics from hearing devices at both ears).

The identification of the particular user may be further improved by utilizing additional information, e.g. other sensors (such as from a movement sensor (e.g. an accelerometer), or an in-ear microphone, a pulse sensor, a feedback estimation sensor, etc.) and/or from a particular keyword spoken by the user to activate a specific authentication mode. Additional information may e.g. consist of or comprise (or be derived from) a parameter of the acoustic system. Additional information may e.g. consist of or comprise (or be derived from) an estimate of a feedback path from the output transducer to a microphone of the hearing device.

The hearing device (or a device in communication with the hearing device, e.g. a smartphone) may be configured to—based on a current electric input signal from a microphone of the hearing device (or possibly from a weighted combination of electric input signals from a multitude of microphones of the hearing device) to compare the identified characteristics of the wearer's voice with corresponding reference characteristics of the voice of said particular user. The reference characteristics of the voice of said particular user may e.g. be stored in a memory of the hearing device (or a device in communication with the hearing device).

The hearing device (or a device in communication with the hearing device, e.g. a smartphone) may be configured to—based on a current electric input signal from a microphone of the hearing device (or possibly from a weighted combination of electric input signals from a multitude of microphones of the hearing device) to compare a parameter of the acoustic system, e.g. the acoustic transfer function (or impulse response) from the wearer's mouth to the hearing device with a corresponding reference parameter, e.g. the acoustic transfer function (or impulse response) of said particular user. A parameter of the acoustic system may e.g. be constituted by or comprise an acoustic (feedback) transfer function (or impulse response) from an output transducer (e.g. a loudspeaker) to an input transducer (e.g. a microphone) of the hearing device. The reference parameter, e.g. the reference acoustic transfer function (or impulse response) of said particular user may e.g. be stored in a memory of the hearing device (or a device in communication with the hearing device).

The transfer function may reflect facial characteristics of the wearer between mouth and ear or the specific acoustics of the ear, e.g. including an ear canal (dimensions and form, etc.). If e.g. the person wearing the hearing device is NOT the particular user, the transfer function would not (necessarily) resemble the transfer function of the user. Thereby an attempt to cheat (e.g. by replaying a recorded segment of the user's voice) can be uncovered (and avoided). In other words, only if 1) characteristics of the person's voice, as well as 2) the acoustic transfer function from mouth to ear of the person wearing the hearing device, match those of the particular user, the user identification signal will reflect a positive identification of the particular user.

In an aspect of the present application, a hearing system comprising at least one hearing device, e.g. a hearing aid, configured to be worn by a particular user at or in an ear, or to be fully or partially implanted in the head at an ear of the user is provided. The hearing system (e.g. the hearing device) comprises at least one microphone (such as two or more microphones) for converting a sound in the environment of the hearing device to an electric input signal. The hearing system may comprise first and second hearing devices adapted for being located at first and second ears of the user. The first and second hearing devices may each comprise at least one microphone. The hearing system further comprises, a processor comprising a) an own voice analyzer configured to characterize the voice of a person presently wearing the hearing device based at least partly on said electric input signal, and to provide characteristics of said person's voice, and b) an acoustic system analyzer for estimating whether or not said hearing device is worn by the user, and to provide a wear control signal indicative thereof. The hearing system further comprises a user identification unit configured to provide a user identification signal indicating whether or not, or with what probability, the person currently wearing the hearing device is said particular user in dependence of said characteristics of said person's voice and said wear control signal. The acoustic system analyzer may be configured to estimate characteristics of the acoustic system when worn by a user.

Characteristics of an acoustic system, when worn by a user, may e.g. relate to own voice detection, or own voice estimation, feedback estimation, etc. For a hearing system comprising two or more microphones the characteristics of the acoustic system may depend on a comparison of the individual (own voice, feedback) transfer functions for the two or more microphones.

The identification of another parameter characteristic of the current user of the hearing device may e.g. be based on a difference between two current electric input signals (e.g. own voice transfer functions) provided by two microphones of the hearing system (e.g. the hearing device) when the signals originate from the user's own voice. The difference may be compared to a reference difference between the two electric input signals (e.g. own voice transfer functions) determined when the hearing system is mounted on the particular user and during speech of the particular user. The identification of another parameter characteristic of the current user of the hearing device may e.g. be based on a difference between two feedback path estimates (e.g. feedback transfer functions) provided by two feedback estimation units of the hearing device for sound from a loudspeaker of a hearing device to two microphones of the hearing device. The difference may be compared to a reference difference between the two feedback path estimates (e.g. feedback transfer functions) determined when the hearing system is mounted on the particular user (in a similar acoustic situation).

In an aspect of the present application, a hearing system comprising at least one hearing device, e.g. a hearing aid, configured to be worn by a particular user at or in an ear, or to be fully or partially implanted in the head at an ear of the user is provided. The hearing system (e.g. the hearing device) comprises at least one microphone (such as two or more microphones) for converting a sound in the environment of the hearing device to an electric input signal. The hearing system may comprise first and second hearing devices adapted for being located at first and second ears of the user. The first and second hearing devices may each comprise at least one microphone. The hearing system further comprises, a processor comprising a) an own voice analyzer configured to characterize the voice of a person presently wearing the hearing device based at least partly on said electric input signal, and to provide characteristics of said person's voice, and b) an own voice acoustic channel analyzer for estimating characteristics of an acoustic channel from the mouth of the person presently wearing the hearing device to the at least one microphone based at least partly on said electric input signal, and to provide characteristics of said acoustic channel of said person. The hearing system further comprises a user identification unit configured to provide a user identification signal indicating whether or not, or with what probability, the person currently wearing the hearing device is said particular user in dependence of said characteristics of said person's voice and said characteristics of said acoustic channel of said person.

The term an 'acoustic channel' is in the present context taken to mean an acoustic transmission path from one location to another, here e.g. from a user's mouth to a microphone of a hearing system or device or from a loudspeaker to a microphone of a hearing device (when the hearing device is mounted at or in an ear of the user). The acoustic channel has properties the influence the acoustic propagation of an acoustic signal through it. Acoustic channel properties include attenuation and delay. Acoustic channel properties may e.g. depend on objects and matter that constitute and/or surround the path/channel (e.g. skin and bone of the user's face (own voice) or skin and form of the user's ear/ear canal (feedback)). Acoustic channel properties may e.g. be frequency dependent. Characteristics of an acoustic channel from the mouth to microphone may e.g. relate to own voice detection, or own voice estimation.

Thereby a hearing system with improved biometric identification may be provided.

The user identification signal may e.g. be determined by a neural network. A neural network may be trained on data based on voice segments of the particular user while the hearing device is located on the particular user. A reference measure for the user identity signal of the particular user may be determined (and stored) based thereon. During use of the hearing device a user identity signal for the current wearer of the hearing device is determined, and compared to the reference measure. If the two measures are similar (e.g. has a difference smaller than a threshold value or a ratio close to 1), a match of the particular user is provided; otherwise the wearer is different from the particular user.

The user identification unit may be configured to determine whether or not or with what probability the voice of the person currently wearing the hearing device matches a voice of the particular user and to provide a voice identifier indicative thereof. The own voice analyzer may be configured to determine the voice identifier based on the characteristics of the person's voice and corresponding characteristics of the particular user's voice, e.g. based on a voice identification algorithm. The voice identification algorithm may e.g. be based on a trained algorithm, e.g. a neural network. The voice identification algorithm may e.g. be based on one-shot learning, e.g. measuring a voice identifier using neural networks, using relatively few examples (of relatively short duration) to learn from, to minimize computational requirements.

The voice identification algorithm may e.g. be based on a Siamese neural network (without training based on the particular user's voice).

The user identification unit may be configured to determine whether or not or with what probability the acoustic channel of said person currently wearing the hearing device matches the acoustic channel of said particular user and to provide an acoustic channel identifier indicative thereof. The own voice acoustic channel analyzer may be configured to determine the acoustic channel identifier based on said characteristics of the acoustic channel of the person currently wearing the hearing device and on characteristics of the corresponding acoustic channel of the particular user, e.g. using an acoustic channel identification algorithm.

The acoustic channel identification algorithm may e.g. be based on a trained algorithm, e.g. a neural network. The acoustic channel identification algorithm may e.g. be based on one-shot learning, e.g. using neural networks, using relatively few examples to learn from, to minimize computational requirements. The acoustic channel identification algorithm may e.g. be based on a Siamese neural network (without training based on the particular user's voice).

The detection of the voice of the person presently wearing the hearing device may be based on a known placement of the at least one microphone relative to the particular user's mouth. The hearing device may be adapted to provide that the at least one microphone is mounted on the user in a fixed position relative to the user's mouth. The hearing device, in particular the at least one microphone, may be adapted to be mounted at (substantially) the same location at or on the user's head (e.g. after it has been taken off (if relevant) and been re-mounted), so that the characteristics of the acoustic channel from the mouth to the at least one microphone are reproducible. In an embodiment, the detection of a the voice of the person presently wearing the hearing device is based on a difference between the signals of two microphones relative to the user's mouth (the relative transfer function of sound from a user's mouth from one microphone to the other).

The detection of the voice of the person presently wearing the hearing device may be based on or influenced by additional information. The additional information may e.g. originate from an accelerometer and/or from a microphone located in the ear canal, and/or from additional information received from a hearing device located at an opposite ear of the user, or from another device, e.g. a smartphone. The accelerometer may e.g. be used to estimate whether a relative tilt (or an average tilt) of the hearing device has changed compared to a reference tilt (e.g. stored in a memory). If e.g. a hearing device exhibits a change compared to a reference tilt, the acoustic transfer function (or impulse response) between the mouth of the user and the at least one microphone of the hearing device may likewise have changed. In such case an alarm signal may be issued (e.g. too instruct the user to adjust the tilt of the hearing device). Determining a deviation from an intended position of microphones of a hearing device and a possible compensation for such dislocation is e.g. discussed in US20150230036A1. In an embodiment, the accelerometer may be used to identify the person wearing the hearing device based on gait analysis.

The characterization of the voice of the person presently wearing the hearing device may be based on a pitch and/or formant) of the voice.

The own voice analyzer and/or the own voice acoustic channel analyzer may comprise a data-driven algorithm, e.g. a neural network. The neural network may be trained on examples of the particular user's voice. The training is performed to be able to distinguish the particular user's voice from other voices. The training of the neural network may e.g. be performed in advance of use of the hearing device. The training may be performed on a single time segment of the user's voice, e.g. of less than 20 sec. duration, e.g. less than 10 sec. duration. The single time segment of training data may be augmented, e.g. by sub-segmentation and shuffling of sub-segments, addition of noise, etc. The neural network may be trained on examples of the particular user's voice while the particular user wears the hearing device. The training is performed to be able to distinguish the particular user's acoustic channel from mouth to the at least one hearing device microphone from other person's corresponding acoustic channels.

The training of the neural network may e.g. be performed in advance of use of the hearing device.

Training and/or calibration of the neural network may preferably be performed in the absence of noise (or at a noise level below a threshold value). In an embodiment, the acoustic reference parameter (e.g. an own voice steering vector or an acoustic system or channel parameter, etc.) and/or the recording of a sequence of the particular user's voice is determined in absence of noise (under controlled acoustic conditions).

The neural network may comprise a Siamese network to learn features for each person's voice, such that a distance measure between voice features of the same person is small, while the distance between voice features of different persons is much higher. Such a network should be able to generalize such that voice features between a person not being part of the trained network still has a small voice feature distance between the voice sample and a new voice sample of the same person.

The hearing system may comprise an output transducer for converting an electric output signal to acoustic or mechanical vibrations. The output transducer may e.g. be a loudspeaker. The output transducer may e.g. be a vibrator of a bone conduction-type hearing device.

The hearing system may comprise a feedback estimation unit for providing an estimate of a current feedback path from the output transducer to said at least one microphone. The estimate of a current feedback path may e.g. comprise an estimate of the transfer function from the output transducer to the at least one microphone at a number of frequencies. The estimate of a current feedback path may e.g. comprise an estimate of the impulse response from the output transducer to the at least microphone.

A parameter of the acoustic system may e.g. be or be derived from the estimate of the current feedback path from the output transducer to said at least one microphone. The acoustic system analyzer may be configured to detect whether the acoustic system of the present wearer of the hearing device matches the corresponding acoustic system of the particular user based on or influenced by said estimate of a current feedback path (e.g. by comparing the current feedback estimate (or a measure derived therefrom) with a reference feedback estimate (or a measure derived therefrom) determined when the hearing system is worn by the particular user.

The own voice acoustic channel analyzer may be configured to detect whether the acoustic channel of the present wearer of the hearing device matches the corresponding acoustic channel of the particular user based on or influenced by said estimate of a current feedback path.

The user identification unit may comprise the feedback estimation unit, or receive a feedback estimate from a feedback estimation unit forming part or a feedback control system of the hearing device (for cancelling or minimizing acoustic (or mechanical) feedback from output transducer to input transducer of the hearing device).

The hearing system (e.g. the hearing device(s)) may be configured to be brought into an authorizing mode, when said user identification signal indicates a match with the particular user.

The hearing system (e.g. the hearing device(s)) may be configured to repeatedly determine the user identification signal.

The hearing system (e.g. the hearing device(s)) may be configured to stay in the authorizing mode until 1) either the user identification signal does not indicate a match with the particular user's identity, or 2) until a request from the user is received by the hearing system, or 3) until a particular termination criterion is fulfilled. The particular termination criterion may be related to an estimate of a current feedback path of the hearing device.

The hearing device may comprise at least a part of the processor. The processor may be located in the hearing device. The processor may be fully or partially located in another, physically separate, device in communication with the hearing device. The processor may be located in the other device. The processor may be located partly in the hearing device and partly in the other device. The other device may e.g. be a remote control device of the hearing system. The other device may e.g. be a smartphone or similar, handheld or body-worn, device with processing and communication capabilities. The own voice analyzer or a part thereof, e.g. the voice identification algorithm may be located in the other device. Likewise, the own voice acoustic channel analyzer or a part thereof, e.g. the acoustic channel identification algorithm may be located in the other device. A conventional voice recognition algorithm, e.g. running on another device, e.g. a smartphone, may e.g. be used to provide the voice identifier.

The hearing device may comprise the own voice acoustic channel analyzer, or a part thereof. The own voice analyzer or a part thereof may be located in another device. The voice identification algorithm may e.g. be located in another device due to processing complexity to off-load this task from the typically limited processing capacity of the hearing device, e.g. a hearing aid.

The hearing device may be constituted by or comprise a hearing aid, a headset, an earphone, an ear protection device or a combination thereof. The hearing system may be constituted by the hearing device, e.g. a hearing aid or a headset. The hearing aid, may e.g. be constituted by or comprise a hearing instrument, e.g. a hearing instrument adapted for being located at the ear or fully or partially in the ear canal of a user.

The hearing system may be configured to enable or disable functionality of the hearing device in dependence of being in said authorizing mode. Such functionality may include one or more of compression (e.g. compressive amplification, e.g. adapted to a user's needs), audio interfaces, output transducer, own voice detection, own voice estimation, etc.). This has the advantage of providing a means to authorize a particular hearing device to a particular hearing aid user (e.g. to avoid misuse of a given hearing device, and/or to avoid applying a wrong frequency dependent amplification/attenuation to a given person, and/or to correct a left right misplacement of the hearing devices on the (particular) user).

The hearing system comprise at least two microphones for providing at least two electric input signals. The at least two microphones may be located in a single hearing device. The at least two microphones may be distributed between two hearing devices, e.g. of a binaural hearing system, e.g. a binaural hearing aid system.

The hearing system, e.g. a hearing device of the hearing system, may comprise a directional microphone system for providing at least one beamformer, e.g. an own voice beamformer, based on predetermined or adaptively updated own voice filter weights, wherein an estimate of the user's own voice is provided in dependence of on said own voice filter weights and said at least two electric input signals.

The hearing system may comprise first and second hearing devices, e.g. hearing aids, adapted for being located at or in first and second ears, respectively, of the user, each of the first and second hearing devices comprising at least one microphone. The hearing system may comprise appropriate antenna and transceiver circuitry configured to allow an exchange of data between the first and second hearing devices. The hearing system may be constituted by or comprise a binaural hearing aid system.

The hearing system may be configured to enter a specific authentication mode via a user interface, from which the authorizing mode can be entered. The hearing system may comprise a user interface from which a specific authentication mode can be entered (so that it can be verified whether or not the wearer of the haring device is indeed the particular user). The user interface may e.g. be implemented as an APP of a smartphone or similar device. The user interface may e.g. be implemented as a voice controlled interface (voice interface). In an embodiment, the authentication mode can be entered via a voice interface, e.g. via a specific keyword spoken by the user. The specific keyword may be identified by the hearing device, while other parts of the voice interface is implemented in an auxiliary device, e.g. a smartphone. Via the user interface, it may be possible to select the service or object for which the authentication of the user (user identification) is needed. In an embodiment, the system is configured to allow the user to initiate the authentication (performed at least partially by the hearing device) as well as communication to the service or object requiring the authentication via the user interface (e.g. implemented as an APP of a smartphone or similar communication device having appropriate communication interfaces (e.g. Bluetooth (and/or Bluetooth Low Energy or similar technology) and/or to a switched network, e.g. the Internet)).

The hearing system may (in addition to the hearing device) comprise an auxiliary device.

In an embodiment, the hearing system is adapted to establish a communication link between the hearing device and the auxiliary device to provide that information (e.g. control and status signals, possibly audio signals) can be exchanged or forwarded from one to the other.

In an embodiment, the auxiliary device comprises a remote control, a smartphone, or other portable or wearable electronic device, such as a smartwatch or the like.

The auxiliary device may provide further inputs to evaluate the identity of the current wearer of the hearing device(s), e.g. from extra sensors. The auxiliary device may be configured to provide another parameter characteristic of the identity of a current user of the hearing device. In combination with the voice identifier, the parameter characteristic of the identity of a current user of the hearing device provided by the auxiliary device may be used to determine the user identification signal.

In an embodiment, the auxiliary device is or comprises a remote control for controlling functionality and operation of the hearing device(s). In an embodiment, the function of a remote control is implemented in a smartphone, the smartphone possibly running an APP allowing to control the functionality of the audio processing device via the smartphone (the hearing device(s) comprising an appropriate wireless interface to the smartphone, e.g. based on Bluetooth or some other standardized or proprietary scheme).

In an embodiment, the auxiliary device is or comprises an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device.

A Hearing Device:

In an aspect, a hearing device, e.g. a hearing aid, adapted to a particular user and configured to provide a user identification signal indicating whether or not a person currently wearing the hearing device is said particular user is provided. The hearing device and/or a device in communication with the hearing device, e.g. a smartphone, comprises a processor configured to provide said identification signal based on a combination of 1) identification of characteristics of the user's voice, and 2) identification of another parameter characteristic of the current user of the hearing device, wherein said another parameter characteristic of the current user of the hearing device comprises an acoustic transfer function, or impulse response, from the user's mouth to one or more microphones of the hearing device, and/or from a loudspeaker to one or more microphones of the hearing device.

The hearing device may be adapted to provide a frequency dependent gain and/or a level dependent compression and/or a transposition (with or without frequency compression) of one or more frequency ranges to one or more other frequency ranges, e.g. to compensate for a hearing impairment of a user. In an embodiment, the hearing device comprises a signal processor for enhancing the input signals and providing a processed output signal.

In an embodiment, the hearing device comprises an output unit for providing a stimulus perceived by the user as an acoustic signal based on a processed electric signal. In an embodiment, the output unit comprises a number of electrodes of a cochlear implant (for a CI type hearing device) or a vibrator of a bone conducting hearing device. In an embodiment, the output unit comprises an output transducer. In an embodiment, the output transducer comprises a receiver (loudspeaker) for providing the stimulus as an acoustic signal to the user (e.g. in an acoustic (air conduction based) hearing device). In an embodiment, the output transducer comprises a vibrator for providing the stimulus as mechanical vibration of a skull bone to the user (e.g. in a bone-attached or bone-anchored hearing device).

The hearing device may comprise an input unit for providing an electric input signal representing sound. In an embodiment, the input unit comprises an input transducer, e.g. a microphone, for converting an input sound to an electric input signal. In an embodiment, the input unit comprises a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

In an embodiment, the hearing device comprises a directional microphone system adapted to spatially filter sounds from the environment, and thereby enhance a target acoustic source among a multitude of acoustic sources in the local environment of the user wearing the hearing device. In an embodiment, the directional system is adapted to detect (such as adaptively detect) from which direction a particular part of the microphone signal originates (including e.g. whether sound originates from the user's mouth (own voice)). This can be achieved in various different ways as e.g. described in the prior art. In hearing devices, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form. The hearing device may comprise an own voice beamformer for detecting and or estimating a user's own voice. The hearing device may comprise a far-field beamformer for detecting and or estimating sound from a sound source other than the user, e.g. a communication partner. The (far-field) sound source is assumed to be located sufficiently far away from the user (e.g. ≥1 m from the user) to provide that the user is in an acoustic far-field from said sound source.

The hearing device may comprise antenna and transceiver circuitry (e.g. a wireless receiver) for wirelessly receiving a direct electric input signal from another device, e.g. from an entertainment device (e.g. a TV-set), a communication device, a wireless microphone, or another hearing device. In an embodiment, the direct electric input signal represents or comprises an audio signal and/or a control signal and/or an information signal. In connection with authentication, 'another device' may e.g. be a financial transaction device (to allow a financial transaction), a locking device (to lock unlock), e.g. of a car, or a home, or other building or container with limited access.

In an embodiment, the hearing device comprises demodulation circuitry for demodulating the received direct electric input to provide the direct electric input signal representing an audio signal and/or a control signal e.g. for setting an operational parameter (e.g. volume) and/or a processing parameter of the hearing device. In general, a wireless link established by antenna and transceiver circuitry of the hearing device can be of any type. In an embodiment, the wireless link is established between two devices, e.g. between an entertainment device (e.g. a TV) and the hearing device, or between two hearing devices, e.g. via a third, intermediate device (e.g. a processing device, such as a remote control device, a smartphone, etc.). In an embodiment, the wireless link is used under power constraints, e.g. in that the hearing device is or comprises a portable (typically battery driven) device. In an embodiment, the wireless link is a link based on near-field communication, e.g. an inductive link based on an inductive coupling between antenna coils of transmitter and receiver parts. In another embodiment, the wireless link is based on far-field, electromagnetic radiation. In an embodiment, the communication via the wireless link is arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), e.g. MSK (minimum shift keying), or QAM (quadrature amplitude modulation), etc.

The wireless link may be configured to establish communication of authentication data between the hearing device and another device or system, e.g. a financial transaction device (e.g. via a mobile phone), an electronic lock (e.g. of a car, a home, a container, etc.), etc.

In an embodiment, the communication between the hearing device and the other device is in the base band (audio frequency range, e.g. between 0 and 20 kHz). Preferably, communication between the hearing device and the other device is based on some sort of modulation at frequencies above 100 kHz. Preferably, frequencies used to establish a communication link between the hearing device and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). In an embodiment, the wireless link is based on a standardized or proprietary technology. In an embodiment, the wireless link is based on Bluetooth technology (e.g. Bluetooth Low-Energy technology).

In an embodiment, the hearing device has a maximum outer dimension of the order of 0.08 m (e.g. a head set). In an embodiment, the hearing device has a maximum outer dimension of the order of 0.04 m (e.g. a hearing instrument).

In an embodiment, the hearing device is a portable (i.e. configured to be wearable) device, e.g. a device comprising a local energy source, e.g. a battery, e.g. a rechargeable battery. The hearing device is e.g. a low weight, easily wearable, device, e.g. having a total weight less than 100 g.

The hearing device may comprise a forward or signal path between an input unit (e.g. an input transducer, such as a microphone or a microphone system and/or direct electric input (e.g. a wireless receiver)) and an output unit, e.g. an output transducer. In an embodiment, the signal processor is located in the forward path. In an embodiment, the signal processor is adapted to provide a frequency dependent gain according to a user's particular needs. In an embodiment, the hearing device comprises an analysis path comprising functional components for analyzing the input signal (e.g. determining a level, a modulation, a type of signal, an acoustic feedback estimate, etc.). In an embodiment, some or all signal processing of the analysis path and/or the signal path is conducted in the frequency domain. In an embodiment, some or all signal processing of the analysis path and/or the signal path is conducted in the time domain.

The hearing device may comprise an analogue-to-digital (AD) converter to digitize an analogue input (e.g. from an input transducer, such as a microphone) with a predefined sampling rate, e.g. 20 kHz. In an embodiment, the hearing devices comprise a digital-to-analogue (DA) converter to convert a digital signal to an analogue output signal, e.g. for being presented to a user via an output transducer.

In an embodiment, the hearing device, e.g. the input unit, and or the antenna and transceiver circuitry comprise(s) a TF-conversion unit for providing a time-frequency representation of an input signal. In an embodiment, the time-frequency representation comprises an array or map of corresponding complex or real values of the signal in question in a particular time and frequency range. In an embodiment, the TF conversion unit comprises a filter bank for filtering a (time varying) input signal and providing a number of (time varying) output signals each comprising a distinct frequency range of the input signal. In an embodiment, the TF conversion unit comprises a Fourier transformation unit for converting a time variant input signal to a (time variant) signal in the (time-)frequency domain. In an embodiment, the frequency range considered by the hearing device from a minimum frequency $f_{min}$ to a maximum frequency $f_{max}$ comprises a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. In an embodiment, a signal of the forward and/or analysis path of the hearing device is split into a number NI of frequency bands (e.g. of uniform width), where NI is e.g. larger than 5, such as larger than 10, such as larger than 50, such as larger than 100, such as larger than 500, at least some of which are processed individually. In an embodiment, the hearing device is/are adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing device may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing device is reduced (e.g. to save power), e.g. to disable wireless communication, and/or to disable specific features of the hearing device.

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device, a remote control, and audio delivery device, a telephone (e.g. a smartphone), an external sensor, etc.

In an embodiment, one or more of the number of detectors operate(s) on the full band signal (time domain). In an embodiment, one or more of the number of detectors operate(s) on band split signals ((time-) frequency domain), e.g. in a limited number of frequency bands.

In an embodiment, the number of detectors comprises a level detector for estimating a current level of a signal of the forward path. In an embodiment, the predefined criterion comprises whether the current level of a signal of the forward path is above or below a given (L-)threshold value. In an embodiment, the level detector operates on the full band signal (time domain). In an embodiment, the level detector operates on band split signals ((time-) frequency domain).

In a particular embodiment, the hearing device comprises a voice detector (VD) for estimating whether or not (or with what probability) an input signal comprises a voice signal (at a given point in time). A voice signal is in the present context taken to include a speech signal from a human being. It may also include other forms of utterances generated by the human speech system (e.g. singing). In an embodiment, the voice detector unit is adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). In an embodiment, the voice detector is adapted to detect as a VOICE also the user's own voice. Alternatively, the voice detector is adapted to exclude a user's own voice from the detection of a VOICE.

In an embodiment, the hearing device comprises an own voice detector for estimating whether or not (or with what probability) a given input sound (e.g. a voice, e.g. speech) originates from the voice of the user of the system. In an embodiment, a microphone system of the hearing device is adapted to be able to differentiate between a user's own voice and another person's voice and possibly from NON-voice sounds.

In an embodiment, the number of detectors comprises a movement detector, e.g. an acceleration sensor. In an embodiment, the movement detector is configured to detect movement of the user's facial muscles and/or bones (e.g. acoustic bone conduction), e.g. due to speech or chewing (e.g. jaw movement) and to provide a detector signal indicative thereof. The movement sensor (e.g. an acceleration sensor) may e.g. be used to detect how the hearing device is mounted at the ear of the wearer, e.g. in order to estimate how the microphone direction of a pair of microphones is tilted compared to a preferred (reference) direction (cf. e.g. US20150230036A1).

The hearing device may comprise a classification unit configured to classify the current situation based on input signals from (at least some of) the detectors, and possibly other inputs as well. In the present context 'a current situation' is taken to be defined by one or more of a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);

b) the current acoustic situation (input level, feedback, etc.), and c) the current mode or state of the user (movement, temperature, cognitive load, etc.);

d) the current mode or state of the hearing device (program selected, time elapsed since last user interaction, etc.) and/or of another device in communication with the hearing device.

The hearing device may comprise an acoustic (and/or mechanical) feedback suppression or echo cancelling system. Acoustic feedback occurs because the output loudspeaker signal from an audio system providing amplification of a signal picked up by a microphone is partly returned to the microphone via an acoustic coupling through the air or other media. The part of the loudspeaker signal returned to the microphone is then re-amplified by the system before it is re-presented at the loudspeaker, and again returned to the microphone. As this cycle continues, the effect of acoustic feedback becomes audible as artifacts or even worse, howling, when the system becomes unstable. The problem appears typically when the microphone and the loudspeaker are placed closely together, as e.g. in hearing aids or other audio systems. Some other classic situations with feedback problems are telephony, public address systems, headsets, audio conference systems, etc. Adaptive feedback cancellation has the ability to track feedback path changes over time. It is based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

In an embodiment, the feedback suppression system comprises a feedback estimation unit for providing a feedback signal representative of an estimate of the acoustic feedback path, and a combination unit, e.g. a subtraction unit, for subtracting the feedback signal from a signal of the forward path (e.g. as picked up by an input transducer of the hearing device).

In an embodiment, the hearing device further comprises other relevant functionality for the application in question, e.g. compression, noise reduction, etc.

Use:

In an aspect, use of a hearing device as described above, in the 'detailed description of embodiments' and in the claims, is moreover provided. In an embodiment, use is provided in a system comprising audio distribution, e.g. a system comprising a microphone and a loudspeaker in sufficiently close proximity of each other to cause feedback from the loudspeaker to the microphone during operation by a user. In an embodiment, use is provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing system comprising a hearing device, e.g. a hearing aid, configured to be worn by a particular user at or in an ear, or to be fully or partially implanted in the head at an ear of the user is furthermore provided by the present application.

The Method Comprises providing at least one electric input signal representing sound in the environment of the hearing device, providing a voice identifier indicative of whether or not, or with what probability, a voice of a person currently wearing the hearing device matches a voice of said particular user, providing an acoustic channel identifier indicative of whether or not, or with what probability, characteristics of an acoustic channel from the mouth of the person presently wearing the hearing device to the at least one microphone matches characteristics of a corresponding acoustic channel of said particular user, and providing a user identification signal indicating whether or not, or with what probability, the person currently wearing the hearing device is said particular user based on said voice identifier and said acoustic channel identifier.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

A Computer Readable Medium:

In an aspect, a tangible computer-readable medium storing a computer program comprising program code means for causing a data processing system to perform at least some (such as a majority or all) of the steps of the method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

An APP:

In a further aspect, a non-transitory application, termed an APP, is furthermore provided by the present disclosure. The APP comprises executable instructions configured to be executed on an auxiliary device to implement a user interface for a hearing device or a hearing system described above in the 'detailed description of embodiments', and in the claims. In an embodiment, the APP is configured to run on cellular phone, e.g. a smartphone, or on another portable device allowing communication with said hearing device or said hearing system.

In an embodiment, the hearing system, including the APP, is configured to enter or terminate an authorizing mode, wherein the user identification signal indicates a match with a particular user of the hearing device from the user interface. The hearing system may be adapted to allow a configuration of the authorizing mode (e.g. to be based on monaural or binaural decision) from the user interface.

Definitions:

In the present context, a 'hearing device' refers to a device, such as a hearing aid, e.g. a hearing instrument, or an active ear-protection device, or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing device may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing device may comprise a single unit or several units communicating electronically with each other. The loudspeaker may be arranged in a housing together with other components of the hearing device, or may be an external unit in itself (possibly in combination with a flexible guiding element, e.g. a dome-like element).

More generally, a hearing device comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence on the processed audio signal. The signal processor may be adapted to process the input signal in the time domain or in a number of frequency bands. In some hearing devices, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing device and/or for storing information (e.g. processed information, e.g. provided by the signal processing circuit), e.g. for use in connection with an interface to a user and/or an interface to a programming device. In some hearing devices, the output unit may comprise an output transducer, such as e.g. a loudspeaker for providing an air-borne acoustic signal or a vibrator for providing a structure-borne or liquid-borne acoustic signal. In some hearing devices, the output unit may comprise one or more output electrodes for providing electric signals (e.g. a multi-electrode array for electrically stimulating the cochlear nerve). In an embodiment, the hearing device comprises a speakerphone (comprising a number of input transducers and a number of output transducers, e.g. for use in an audio conference situation).

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal to the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing device, e.g. a hearing aid, may be adapted to a particular user's needs, e.g. a hearing impairment. A configurable signal processing circuit of the hearing device may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing device via an interface to a programming device (fitting system), and used by a processing algorithm executed by the configurable signal processing circuit of the hearing device.

A 'hearing system' refers to a system comprising one or two hearing devices, and a 'binaural hearing system' refers to a system comprising two hearing devices and being adapted to cooperatively provide audible signals to both of the user's ears. Hearing systems or binaural hearing systems may further comprise one or more 'auxiliary devices', which communicate with the hearing device(s) and affect and/or benefit from the function of the hearing device(s). Auxiliary devices may be e.g. remote controls, audio gateway devices, mobile phones (e.g. smartphones), or music players. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person. Hearing devices or hearing systems may e.g. form part of or interact with public-address systems, active ear protection systems, handsfree telephone systems, car audio systems, entertainment (e.g. karaoke) systems, teleconferencing systems, classroom amplification systems, etc.

Embodiments of the disclosure may e.g. be useful in applications such as hearing aids and other head worn hearing devices.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1:
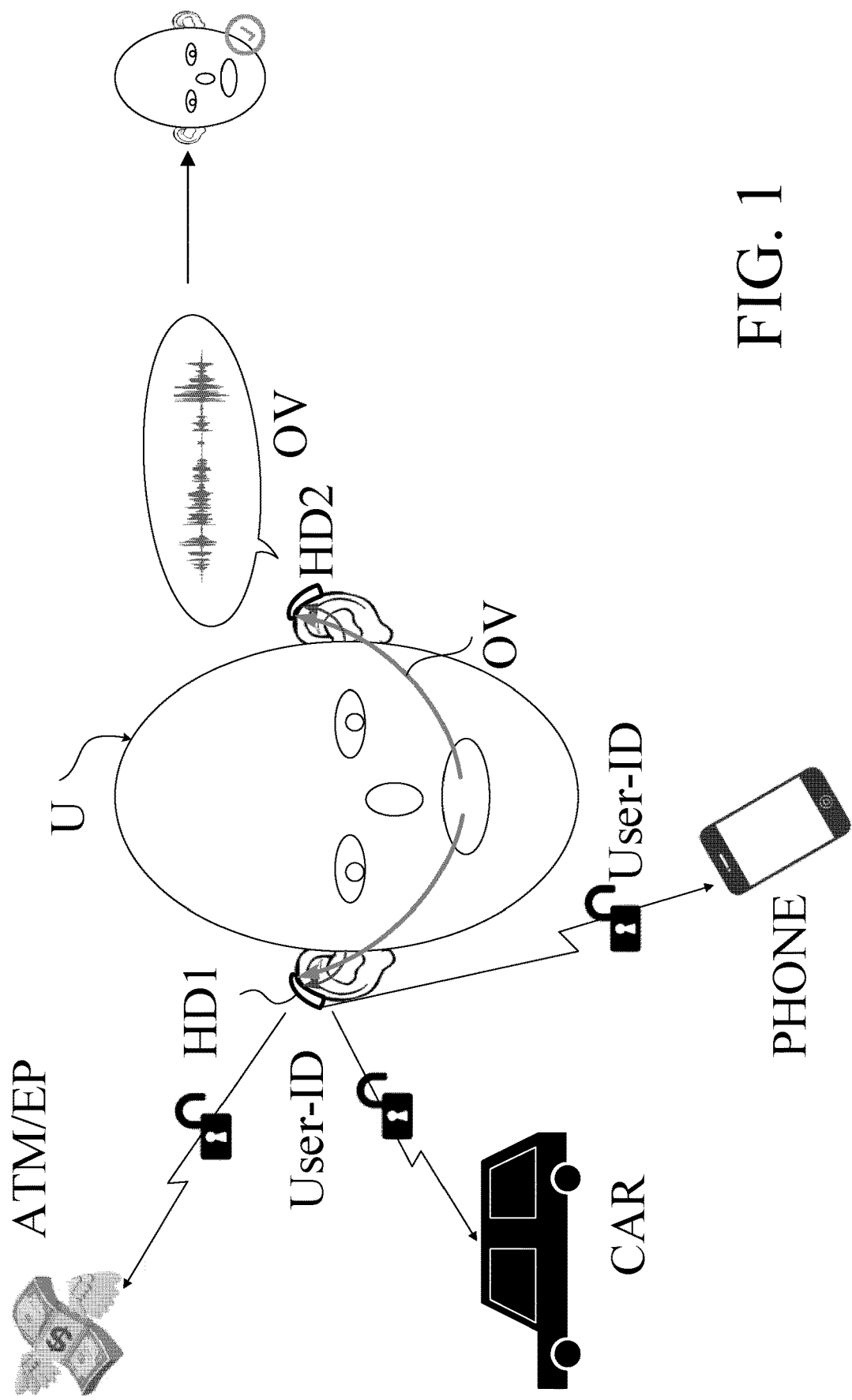
FIG. 1 schematically illustrates that a hearing device which has been paired with e.g. a phone or a car can be used to unlock the phone such that the phone is automatically unlocked when connected to the hearing device(s), and it is verified that the hearing device(s) is(are) mounted at the owner's ear(s), FIG. 2 schematically shows how own voice may be detected based on the acoustic properties at the hearing device(s) as the transfer function between the hearing device (HD) microphones.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. hearing aids or headsets or ear buds.

Biometric identification relates to identification of a person based on that person's unique biological characteristics, e.g. DNA, retina or iris pattern, fingerprint, etc. Safe biometric identification of a person is important in many applications. A biometric identification may e.g. replace the need for passwords and ease the user's access to devices or places. Biometric identification may e.g. be utilized for unlocking a smartphone, for identification/authentication using (electronic) payments/transactions or as replacement/in addition to keys for cars or the home.

Hearing devices such as hearing aids, cochlear implants, bone anchored hearing aids, hearables, headsets or hearing glasses are typically mounted at a fixed position on the head. The device in question thus has the same acoustic properties, when (every time) it is located at the ear. We propose to use the acoustic properties of hearing devices e.g. in connection with recognition of the particular user's own voice (and/or a keyword spoken by the particular user) for biometric identification. This is illustrated in FIG. I. The biometric identification of the particular user (U) may be based on voice identification and on identification of acoustic properties of the particular user's own voice (OV) related to the placement of the (microphone(s) of the) hearing device (HD1, HD2).

FIG. 1 shows that a hearing device (HD1) which has been paired with e.g. a phone (PHONE) or a car (CAR) can be used to unlock the phone such that the phone is automatically unlocked when connected to the hearing device(s) (HD1, HD2), and it is verified that the hearing device(s) is(are) mounted at the owner's (U) ear(s). In a similar way, the hearing device (HD1) can be used to unlock the immobilizer in a vehicle (CAR) or as ID in connection with electronic payment (ATM/EP). A combination of own voice (OV) recognition, own voice detection and acoustic feedback (cf. e.g. FIG. 3) can be used to verify the identification (User-ID) of the user (U).

Figure 2:
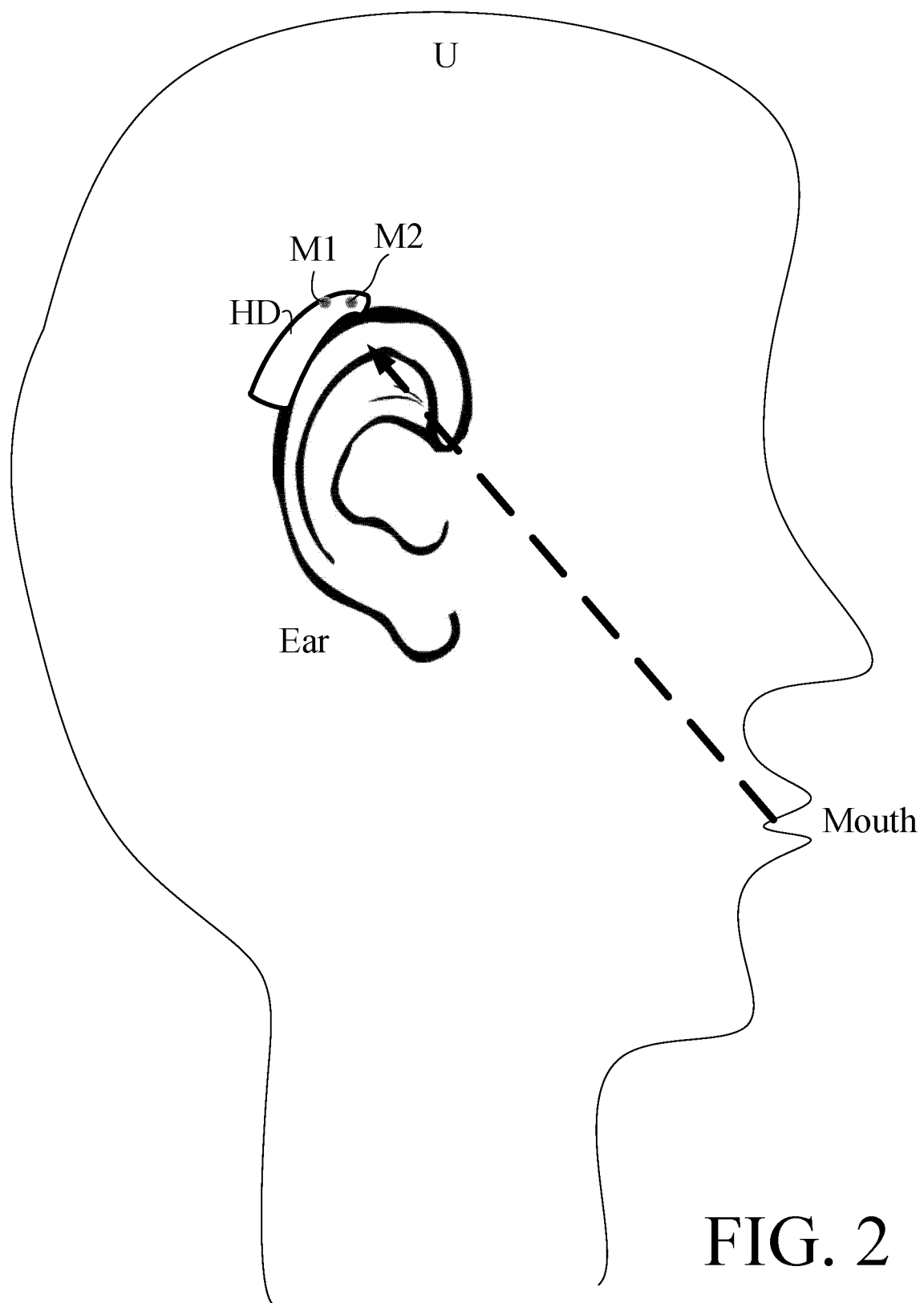

FIG. 2 shows how own voice may be detected based on the acoustic properties at the hearing device(s) (HD) as the transfer function between the hearing device (HD) microphones (as indicated by the dashed line from mouth (Mouth) to hearing device (HD). As the mouth is located at a certain distance and angle compared to the microphone array (M1, M2), the voice originating from the mouth can be distinguished from other voices. A voice recognizer may, based on properties of the user's voice such as e.g. pitch, be able to distinguish the user's voice from other voices. By combining both acoustic properties and voice properties, it can be verified that the hearing device owner (U) indeed is the person wearing the hearing device(s) (HD).

FIG. 2 shows a hearing device (HD) mounted at a user (U). The features for identifying the user wearing the hearing device according to the present disclosure may be divided in two groups: 1) acoustic features and 2) non-acoustic features.

Acoustic features: Due to the position of the hearing device, the sound originating from the mouth reaches the microphones of the hearing device from a certain direction. This direction may be distinguished from sounds impinging from other directions, such that the user's own voice can be detected based on the acoustic properties of the sound (see e.g. EP3588981A1). The detection can be further improved by taking both left and right hearing devices into account, and/or further improved by utilizing additional information from an accelerometer or an in-ear microphone.

Non-acoustic features: In addition to the acoustic properties of the system capturing the user's own voice, properties of the voice signal itself may be used to further improve the identification of the user. Properties of the voice such as pitch may be used to recognize the user. A voice recognition system may e.g. be based on a neural network which has been trained on examples of the user's voice in order to distinguish the user's voice from other voices. Similarly, the acoustic properties of the user may be trained in advance.

Figure 3:
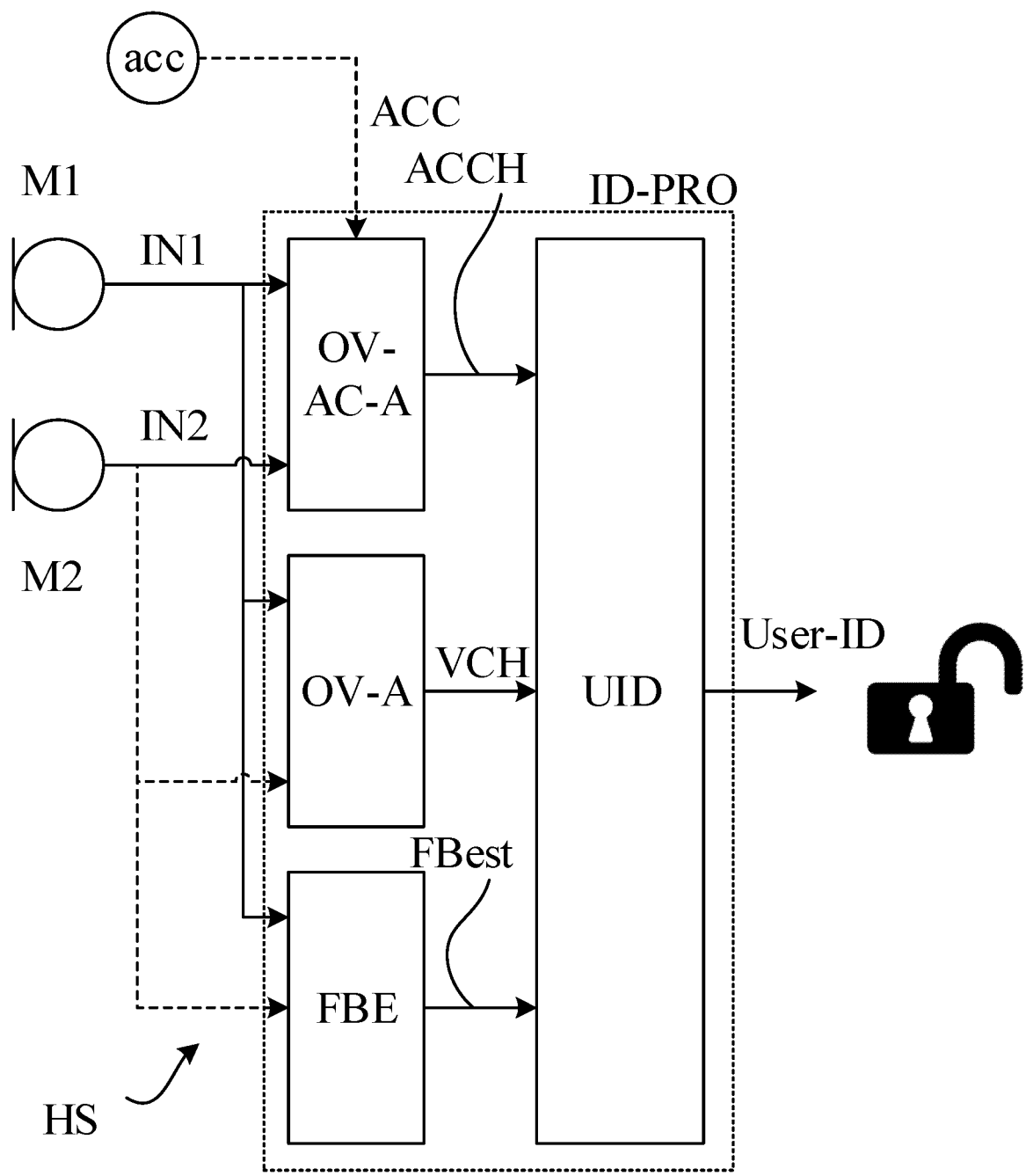
FIG. 3 shows a first embodiment of a hearing system comprising a hearing device, the hearing system comprising a user identification processor according to the present disclosure, the hearing system comprising a multitude of microphones, an own voice detector, an own voice recognizer, and a feedback path estimation unit, FIG. 4A schematically shows a second embodiment of a hearing system comprising a hearing device, the hearing system comprising a user identification processor according to the present disclosure to recognize that the correct user is wearing the hearing device, and FIG. 4B schematically shows a third embodiment of a hearing system comprising a hearing device, the hearing system comprising a user identification processor according to the present disclosure.

In addition to acoustic own voice acoustic channel analysis (OV-AC-A) and own voice analysis (recognition or characterization) (OV-A), also the acoustic feedback path from the hearing device's speaker to the microphone path (FBE) may be used to verify that the hearing instruments are mounted at the ears of the user (cf. e.g. FIG. 3). FIG. 3 shows an embodiment of a hearing system (HS) comprising a hearing device. The hearing system comprises a user identification processor (ID-PRO) according to the present disclosure. The hearing system comprises a multitude of microphones (here two, M1, M2), an own voice acoustic channel analyzer (OV-AC-A) providing characteristics of the acoustic system capturing the wearer's voice, e.g. based on one or both microphone signals (IN1, IN2) (cf. signal ACCH), and an own voice analyzer (OV-A) providing intrinsic characteristics of the voice of the wearer e.g. based on one or both microphone signals (IN1, IN2) (cf. signal VCH). The hearing system further comprises a feedback path estimation unit (FBE) for providing an estimate of the feedback path (FBP) at a given point in time, e.g. based on one or both microphone signals (IN1, IN2) (cf. signal FBest). The three signals characterizing the acoustic system (ACCH, FBest) and the voice of the wearer (VCH) are fed to a user identification unit (UID) configured to provide a user identifier (signal User-ID) indicative of whether or not (or with what probability) the current wearer of the hearing device is the particular user (e.g. U in FIG. 1). The user identifier is determined in dependence of the acoustic system (or acoustic channel) characteristics and the voice characteristics, i.e. User-ID=f(ACCH, FBest, VCH), where f is a linear or non-liner function, e.g. a logic function, e.g. ACH1*ACH2*VCH, if signals ACH1, ACH2 and VCH are defined as Boolean variables assuming binary values TRUE or FALSE (1 or 0). Otherwise, the user identifier may be a (e.g. normalized) weighted sum of the available input variables (here ACH 1, ACH2 and VCH), e.g. according to their assumed reliability (the more reliable, the larger weight). The user identifier (User-ID) may e.g. be determined by an algorithm, e.g. comprising a trained neural network, e.g. a deep neural network (DNN).

FIG. 3 illustrates the use of different detectors to contribute to the verification of the identity of the user (using acoustic system related (ACCH, FBest, ACC) as well as non-acoustic system related (VCH) features) and hereby use the hearing device to unlock other devices (via user identification signal User-ID, or a signal or key derived therefrom, transmitted to a service or device that needs authentication of the user). In addition to unlocking other devices (cf. e.g. FIG. 1), the hearing device (HD) itself may be personalized based on the currently detected user (e.g. to activate personalized settings (e.g. initiated by a matching value of the User-ID), e.g. regarding volume, directionality, noise reduction, etc.). The authentication procedure according to the present disclosure may be combined with authentication procedures from other devices. In an embodiment, Maybe one subset of detectors/features may be utilized for user verification (e.g. entering an authorizing mode of operation), while another subset of detectors/features may be more applicable for de-verification of the user (e.g. that the user is de-verified (e.g. leaving an authorizing mode of operation), if it has been detected that one or both hearing devices are no longer mounted at the ear).

In order to identify that the hearing device(s) indeed are mounted at the owner's ears, an authentication based on own voice analysis (cf. own voice acoustic channel analyser (OV-AC-A)) is proposed. The own voice acoustic channel analysis may be based on the acoustic differences between the different microphones (M1, M2 providing electric input signals IN1, IN2, respectively) and/or in addition the detected vibrations correlated with the user's voice (e.g. detected by accelerometer ace (signal ACC fed to one of the own voice acoustic channel analyser (OV-AC-A) providing acoustic channel characteristics ACCH). Thereby it is can verified whether or not the voice picked up by the microphones actually originates from the user wearing the hearing device (where the accelerometer is located). The own voice recognition may be based on the properties of the user's voice such as pitch (cf. own voice analyser (OV-A) providing voice characteristics VCH). This may be based on at least one microphone signal (here two, IN1, IN2, are available). In addition, the estimated feedback path (FBest) between a loudspeaker (cf. e.g. OT in FIG. 7) and the first and second microphones (M1, M2) of the hearing device (HD) may be used to ensure that the hearing instrument(s) is/are located at the ear(s) of the user (cf. feedback estimation unit (FBE) providing acoustic characteristics FBest). In the case where microphones are available at both ears, the decision regarding the user identification may be based on all the available microphones/sensors (from both ears).

FIG. 4A shows an embodiment of a hearing system (HS) comprising a hearing device. The hearing system comprises a user identification processor (ID-PRO) according to the present disclosure to recognize that the correct user is wearing the hearing device. The hearing device, e.g. a hearing aid, is e.g. configured to be worn by a particular user at or in an ear, e.g. as a BTE or ITE (or RITE (receiver in the ear)) style air conduction hearing aid. The hearing device, e.g. a hearing aid, may be fully or partially implanted in the head at an ear of the user, e.g. in the form of a bone conduction hearing aid or a cochlear implant type hearing aid. The hearing device is adapted to a particular user, e.g. in that it provides a frequency and level dependent gain to an input signal representing sound to compensate for the user's hearing impairment (hearing aid), before a processed signal is presented to the user via an output unit (cf. e.g. FIG. 6, 7). It may additionally or alternatively be adapted to the particular user in other ways, e.g. by being mechanically adapted to the physiognomy (e.g. ear) of the particular user.

Further, the hearing device may comprise reference data that reflect characteristic properties of the particular user, e.g. characteristics of the voice of the user (e.g. pitch (fundamental frequency)), and/or characteristics of the acoustic channel from the user's mouth to a microphone or microphones of the hearing device when properly mounted on the particular user (e.g. an acoustic transfer function or impulse response). The data may be stored in a memory accessible to the identification processor (ID-PRO, e.g. located in the hearing device). The hearing device comprises at least one microphone (here one (M)) for converting a sound in the environment of the hearing device to an electric input signal (IN). The hearing system (e.g. the hearing device and/or a separate processing device, e.g. a remote control device or a smartphone or the like) comprises a processor (ID-PRO) for identifying whether or not the present wearer of the hearing system (or hearing device) is the particular user that the system expects it to be (is adapted to). As described in connection with FIG. 3, the (identification) processor (ID-PRO) comprises an own voice analyser (OV-A) coupled to the microphone (M), receiving electric input signal IN (or a processed version thereof). The own voice analyser (OV-A) provides characteristics (VCH) of the voice of the person wearing the hearing device. Based thereon, the user identification unit (UID) is configured to provide a voice identifier (VID) indicative of whether or not, or with what probability, the voice of a person currently wearing the hearing device matches a voice of the particular user (cf. e.g. FIG. 4B). The processor (ID-PRO) further comprises an own voice acoustic channel analyser (OV-AC-A) configured to provide characteristics (ACCH) of an acoustic channel from the wearers mouth to the microphone(s) (M) of the hearing device. Based thereon, the user identification unit (UID) is configured to provide an acoustic channel identifier (ACID) indicative of whether or not, or with what probability, the acoustic channel from the mouth of the person presently wearing the hearing device to the microphone (M) of the hearing device matches a corresponding acoustic channel of the particular user (cf. e.g. FIG. 4B). The hearing system (HS), here the user identification unit (UID), is further configured to provide a user identification signal (User-ID) indicating whether or not, or with what probability, the person currently wearing the hearing device is the particular user in dependence of the voice identifier (VID) and the acoustic channel identifier (ACID) (cf. e.g. FIG. 4B). Thereby an improved identification signal is provided. The hearing system (HS) (e.g. the hearing device) further comprises a transmitter (or transceiver) for transmitting the user identification signal (User-ID) to another device (e.g. in encrypted form). The user identification signal (User-ID) may be used to unlock (or enable the use of) a service (e.g. a financial or information service) or an object (e.g. a vehicle) (cf. e.g. FIG. 1).

Figure 4B:
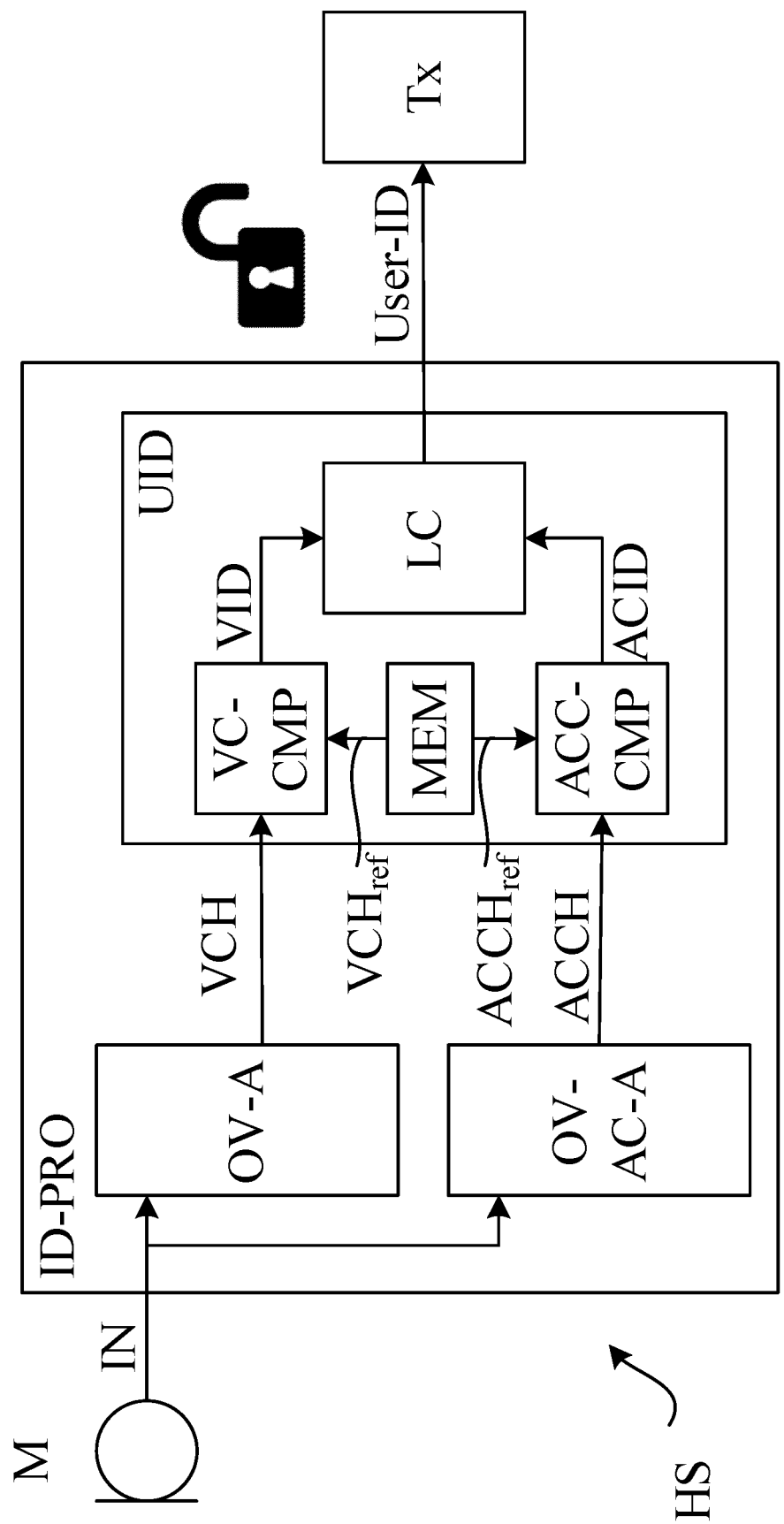

FIG. 4B schematically shows an embodiment of a hearing system (HS) comprising a hearing device, the hearing system comprising a user identification processor (ID-PRO) according to the present disclosure. The embodiment of FIG. 4b is similar to the embodiment of FIG. 4A, except that the user identification unit (UID) is exemplified. The user identification unit (UID) of FIG. 4B comprises a memory (MEM) wherein reference characteristics of the voice of said particular user and reference characteristics of the acoustic channel from the particular user's mouth to the microphone(s) of the hearing aid are stored. The reference characteristics of the voice and/or acoustic channel of the particular user may be stored in a memory of the hearing device or in a device in communication with the hearing device. Reference characteristics of the voice may comprise a fundamental frequency (and possibly one more formant frequencies). Reference characteristics of the acoustic channel may comprise an acoustic transfer function at a number of frequencies (or an impulse response). The hearing device (or a device in communication with the hearing device), here the user identification unit (UID), comprises a comparator (VC-CMP) configured to compare the identified characteristics of the wearer's voice (VCH) with corresponding reference characteristics ($VCH_{ref}$) of the voice of said particular user, and to provide a voice identifier (VID) indicative of whether or not or with what probability the voice of said person currently wearing the hearing device matches a voice of said particular user. Likewise the hearing device (or a device in communication with the hearing device), here the user identification unit (UID), comprises a comparator (ACC-CMP) configured to compare the identified characteristics of the wearer's acoustic channel (ACCH) with corresponding reference characteristics ($ACCH_{ref}$) of the particular user, and to provide a resulting acoustic channel identifier (ACID) indicative of whether or not or with what probability the acoustic channel of said person currently wearing the hearing device matches the acoustic channel of said particular user. The user identification unit (UID) further comprises a combination unit for providing a user identification signal (User-ID) indicating whether or not, or with what probability, the person currently wearing the hearing device is the particular user. The user identification signal (User-ID) may e.g. be a result of a logic combination of the respective voice and acoustic channel identifiers (VID, ACID), e.g. a weighted combination, e.g. a combination of probabilities of the respective identifiers (VID, ACID).

Figure 5:
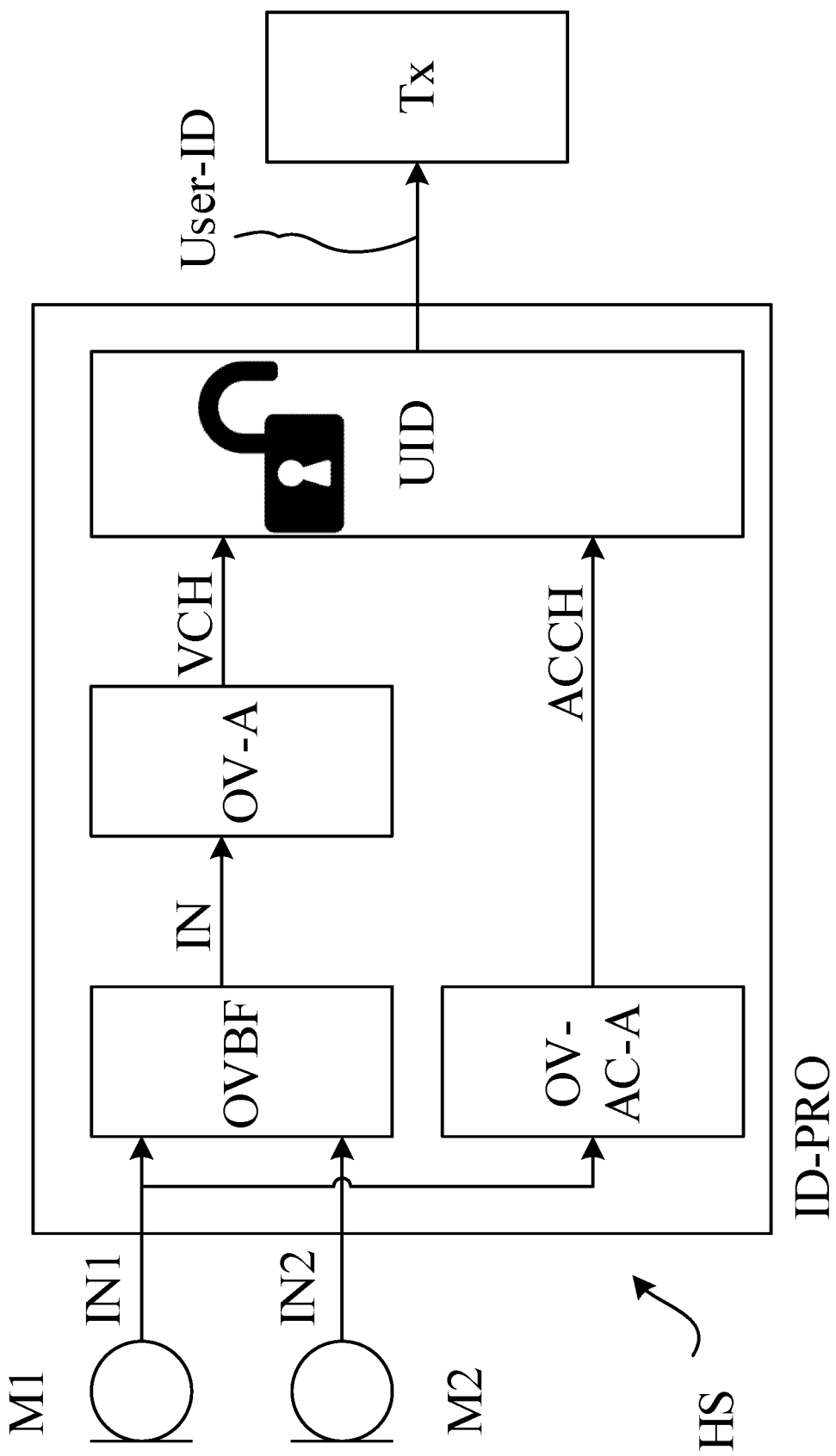
FIG. 5 shows a fourth embodiment of a hearing system comprising a hearing device, the hearing system comprising a user identification processor according to the present disclosure, the hearing system comprising a multitude of microphones and an own voice beamformer.

FIG. 5 shows an embodiment of a hearing system (HS) comprising a hearing device. The hearing system comprises a user identification processor (ID-PRO) according to the present disclosure and a multitude of microphones (here two, (M1, M2)) and an own voice beamformer (OVBF). The embodiment of FIG. 5 is similar to the embodiment of FIG. 4A, except that the embodiment of FIG. 5 comprises two microphones (M1, M2) instead of one (M) and additionally comprises a beamformer filter (OVBF) providing an own voice beamformer directed at the user's mouth (e.g. as a linear combination of the electric input signals IN1, IN2 from the two microphones M1, M2). The beamformer filter provides the electric input signal IN to the own voice analyser OV-A. Apart from that the embodiment of FIG. 5 is equivalent to the embodiment described in connection with FIG. 4A.

Figure 6:
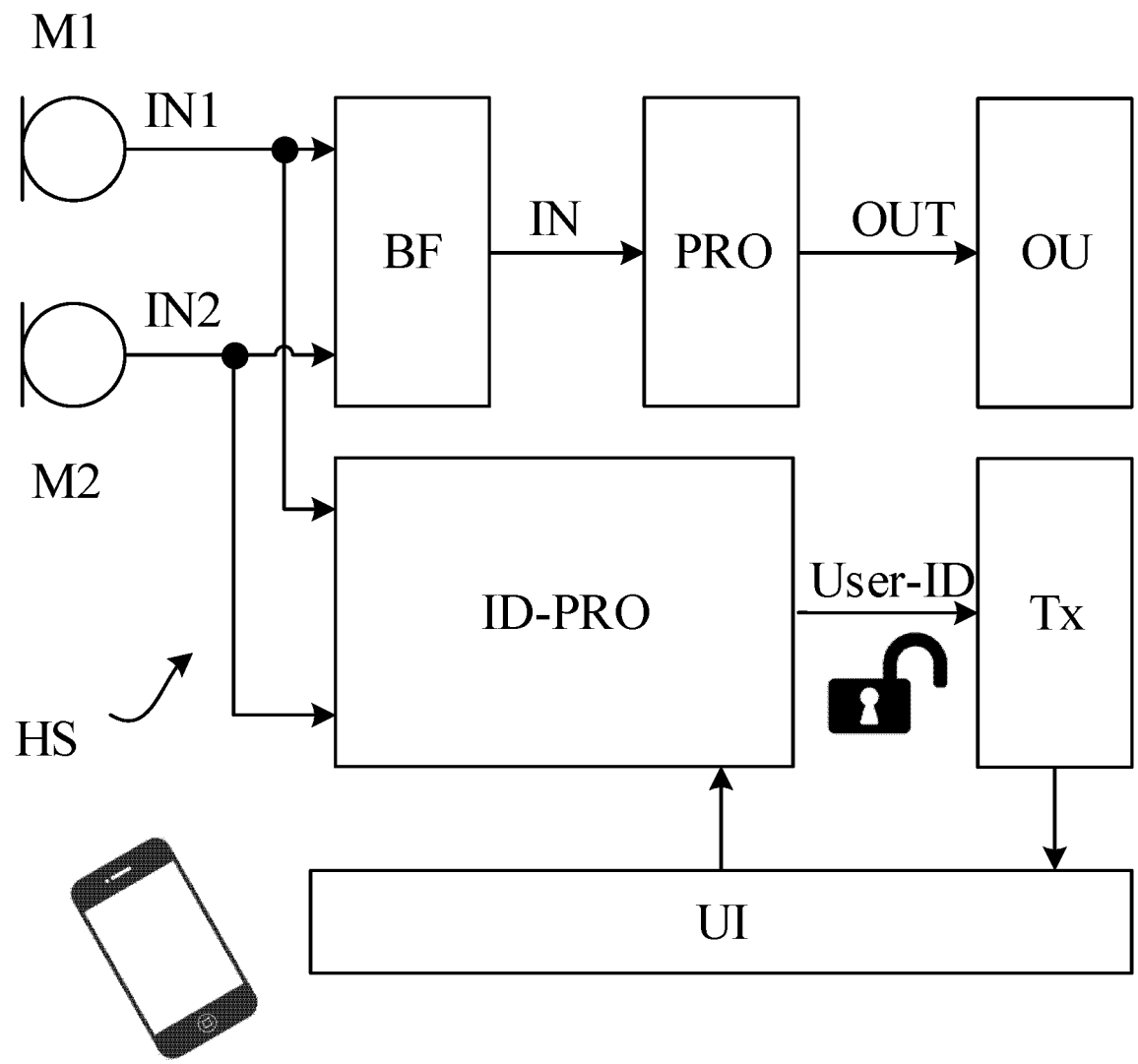
FIG. 6 shows a fifth embodiment of a hearing system comprising a hearing device, the hearing system comprising a user identification processor according to the present disclosure, the hearing system comprising a multitude of microphones and a user interface.

FIG. 6 shows an embodiment of a hearing system (HS) comprising a hearing device. The hearing system comprises a user identification processor (ID-PRO) according to the present disclosure, a forward path comprising a multitude of microphones (M1, M2), a beamformer filter (BF), a signal processor (PRO), and an output unit (OU). The hearing system further comprises a transceiver (Tx, and a corresponding receiver for receiving data from the user interface) and a user interface (UI) allowing a user to influence functionality of the hearing system (HS) and to handle an authorization process based on the user identification signal (User-ID), e.g. to relay the user identification signal (User-ID) to an appropriate service (e.g. a payment) or object (e.g. a vehicle). The user interface (UI) may be implemented in an auxiliary device (e.g. a smartphone (in communication with the hearing system or hearing device) as indicated by the symbol to the left of the user interface (UI) in the bottom left corner of FIG. 6). In an embodiment, the hearing device comprises the elements shown in FIG. 6 (except the user interface which may be implemented as an APP of a smartphone). The user identification processor (ID-PRO) may e.g. be implemented as described in connection with FIG. 3, 4A, 4B, or 5. The inputs to the own voice acoustic channel analyser (OV-AC-A) may include the second electric input signal IN2 as well as the first electric input signal IN1. Characteristics of both acoustic channels from the wearer's mouth toe each of the microphones M1, M2 may be extracted by the own voice acoustic channel analyser (OV-AC-A). The characteristics of each channel may be compared to corresponding reference values of each channel, e.g. stored in a memory (e.g. relevant, if the two acoustic channels are very different (e.g. in case one microphone is located in or at an ear canal and another microphone is located outside the ear canal, e.g. bat or behind pinna)). The characteristics of the two channels may be averaged and compared to a corresponding reference (average) value, e.g. stored in a memory. The forward path of the hearing system (HS), e.g. a hearing device, may implement a normal forward path of a hearing device (e.g. a hearing, aid) wherein spatial filtering is provided by the beamformer filter (BF) based on electric input signals (IN1, IN2) and a resulting beamformed signal (IN) is further processed (e.g. subject to further noise reduction and compressive amplification etc.) by signal processor (PRO). The beamformer filter (BF) may e.g. be implemented as or comprise an MVDR beamformer (cf. e.g. [Brandstein & Ward; 2001]). The signal processor (PRO) provides a processed output signal (OUT) which is fed to output unit (OU) for presentation to the user, e.g. as an acoustic (air conduction) signal or as mechanical vibration applied to skull bone or as electric stimuli of an electrode array of a cochlear implant.

Figure 7:
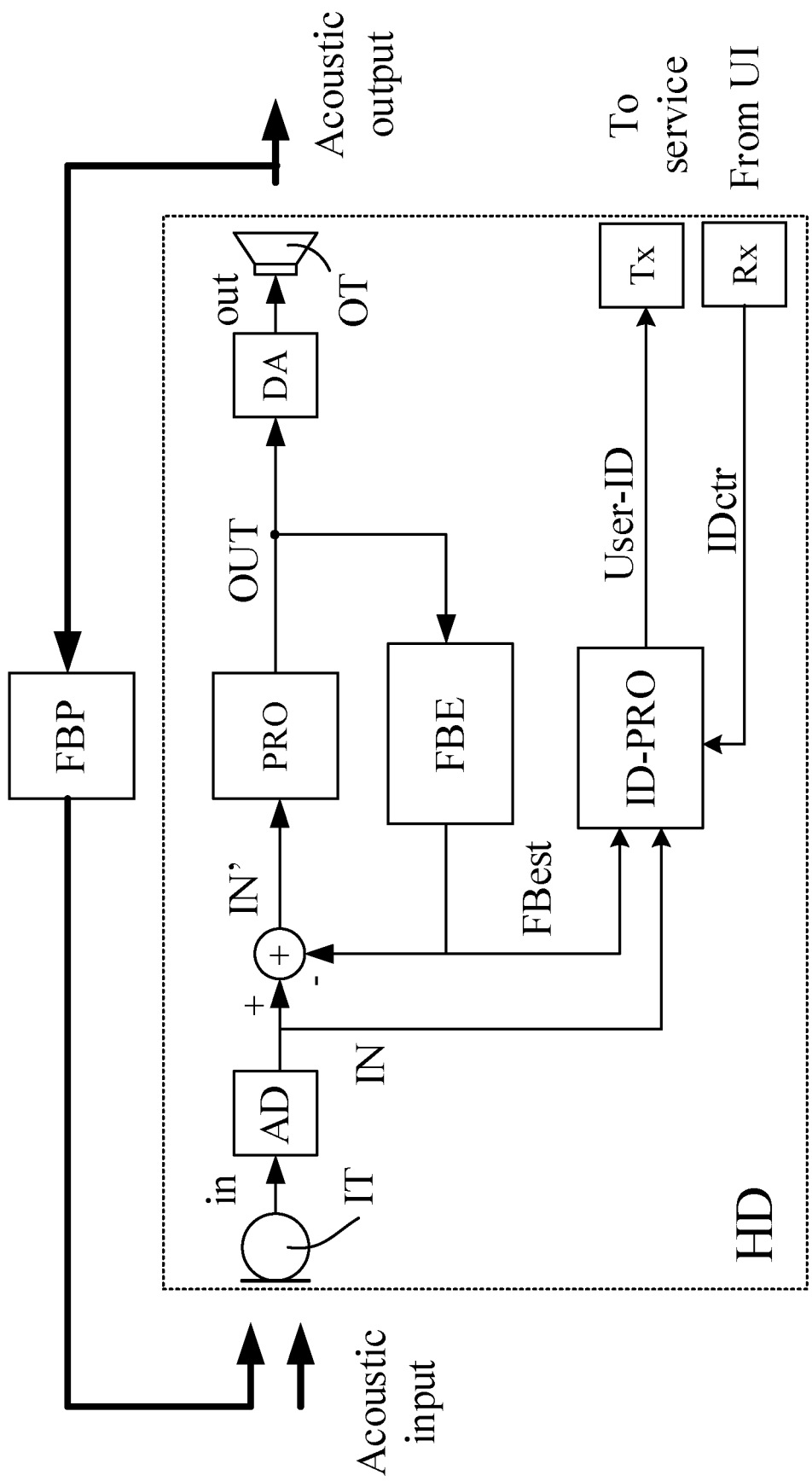
FIG. 7 shows an embodiment of a hearing device comprising a user identification processor according to the present disclosure, the hearing device comprising a microphone, and a feedback control system comprising a feedback path estimation unit.

FIG. 7 shows an embodiment of a hearing device (HD) comprising a user identification processor (ID-PRO) according to the present disclosure. The hearing device (HD) comprises a single microphone (IT), and a feedback control system comprising a feedback path estimation unit (FBE) and a combination unit ('+'). The embodiment of a hearing device of FIG. 7 is similar to the embodiment of a hearing system shown in FIG. 6 (apart from the specific mention of the hearing device, the presence of only one microphone in FIG. 7, the specific presence of a loudspeaker in FIG. 7, and the presence of the feedback control system in FIG. 7). Again, the user identification processor (ID-PRO) may e.g. be implemented as described in connection with FIG. 3, 4A, 4B, or 5. In FIG. 7, the user interface (e.g. implemented in an auxiliary device) is indicated by communication interface (transceiver Tx, Rx) allowing transmission of the user identification signal (User-ID), e.g. encrypted, to the user interface (or directly to a service or device requesting such user identification), and allowing reception of data from the user interface, e.g. for controlling (e.g. initiating) a user identification (cf. signal IDctr). The feedback path estimation unit (FBE) is configured to estimate a feedback path (FBP) from the output transducer (loudspeaker, OT) to the input transducer (microphone, IT), cf. signal FBest. The estimate of the feedback path FBest is subtracted from the (digitized) electric input signal IN in combination (e.g.

subtraction) unit ('+') to provide feedback corrected input signal IN' to the signal processor (PRO). The estimate of the feedback path FBest is also fed to the user identification processor (ID-PRO) for use in the identification of the present wearer of the hearing device (as also discussed in connection with FIG. 3, where the feedback estimation unit (FBE) is indicated to form part of the user identification processor (ID-PRO)). The forward path of the hearing device (HD) of FIG. 7 comprises respective analogue to digital (AD) and digital to analogue (DA) converters to digitize the analogue electric input signal (in) from the microphone (M) and to convert the digital processed output signal (OUT) to an analogue output signal (out) before it is fed to the output transducer (OT).

Characteristics of an acoustic channel from a user's mouth to first and second microphones of a hearing device is e.g. discussed in EP3328097A1.

Figure 8:
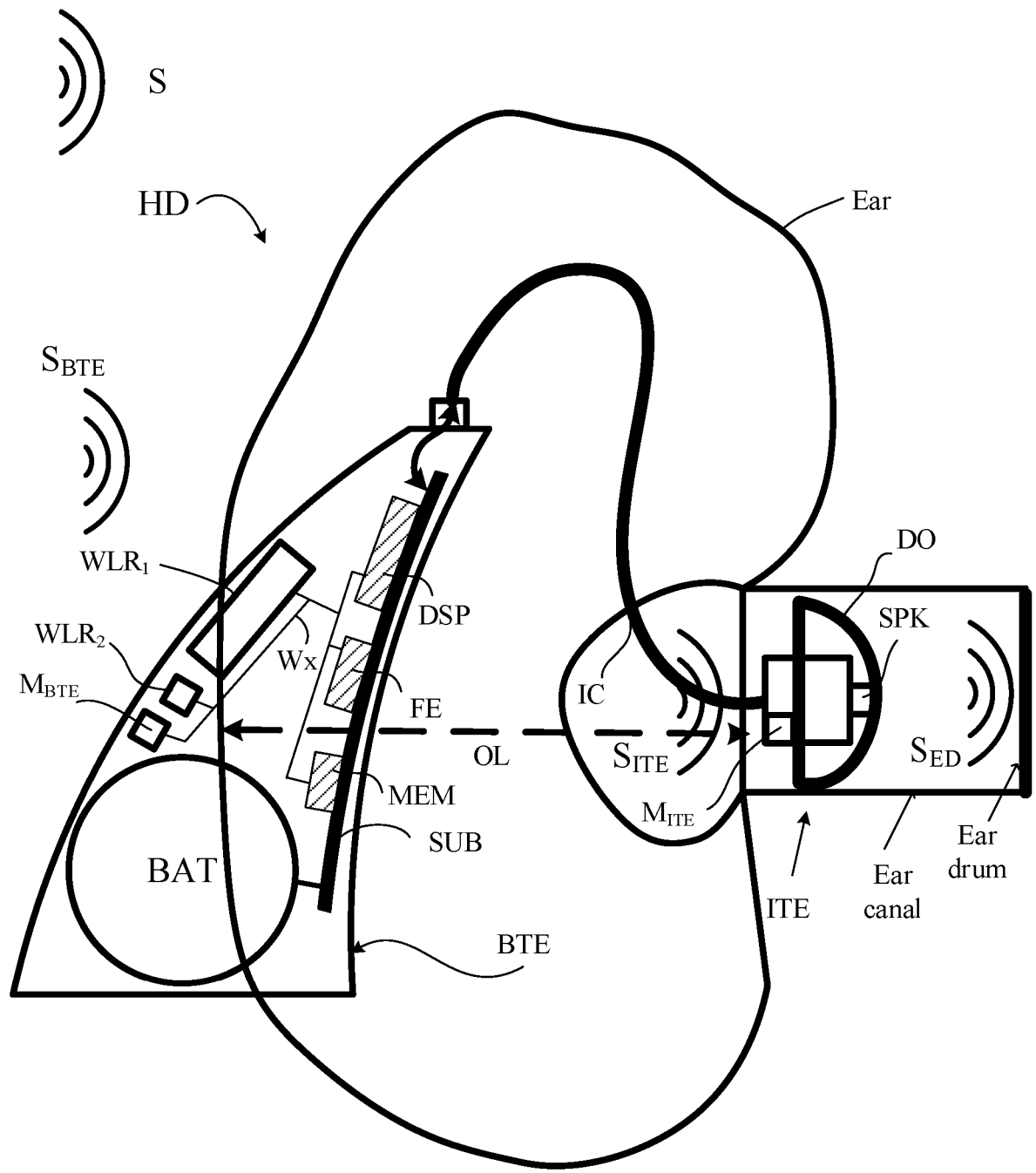
FIG. 8 shows an embodiment of a hearing device according to the present disclosure.

FIG. 8 shows an exemplary hearing device according to the present disclosure. The hearing device (HD), e.g. a hearing aid, is of a particular style (sometimes termed receiver-in-the ear, or RITE, style) comprising a BTE-part (BTE) adapted for being located at or behind an ear of a user and an ITE-part (ITE) adapted for being located in or at an ear canal of a user's ear and comprising an output transducer (SPK), here a receiver (loudspeaker). The BTE-part and the ITE-part are connected (e.g. electrically connected) by a connecting element (IC) and internal wiring in the ITE- and BTE-parts (cf. e.g. schematically illustrated as wiring Wx in the BTE-part).

The hearing device of FIG. 8 contains two input transducers ($M_{BTE}$ and $M_{ITE}$), e.g. microphones, one ($M_{ITE}$, in the ITE-part) is located in or at the ear canal of a user and the other ($M_{BTE}$, in the BTE-part) is located elsewhere at the ear of the user (e.g. behind the ear (pinna) of the user), when the hearing device is operationally mounted on the head of the user. In the embodiment of FIG. 8, the hearing device is configured to provide that the two input transducers ($M_{BTE}$ and $M_{ITE}$) are located along a substantially horizontal line (OL) when the hearing device is mounted at the ear of the user in a normal, operational state (cf. e.g. input transducers $M_{BTE}$ and $M_{ITE}$ and double arrowed, dashed line OL in FIG. 8). This has the advantage of facilitating beamforming of the electric input signals from the input transducers in an appropriate (horizontal) direction, e.g. in the 'look direction' of the user (e.g. towards a target sound source). In an embodiment, a further microphone may be included in the BTE-part near the top of the BTE-housing (around the connector for the connecting element (IC). This has the advantage that an improved own voice beamformer (cf. e.g. FIG. 5) can be generated from such extra BTE-microphone and the ITE microphone ($M_{ITE}$) (because the microphone axis of those two microphones would point out of the horizontal plane (and more or less towards the user's mouth).

The input unit further comprises two (e.g. individually selectable) wireless receivers ($WLR_1$, $WLR_2$) for providing respective directly received auxiliary audio input signals (e.g. from microphones in the environment, or from other audio sources, e.g. streamed audio, and/or to enable communication with a user interface implemented in an auxiliary device). The BTE-part comprises a substrate SUB whereon a number of electronic components (MEM, FE, DSP) are mounted, including a memory (MEM), e.g. storing different hearing aid programs (e.g. parameter settings defining such programs, and/or reference characteristics of the particular user's voice and own voice acoustic channel) and/or input source combinations ($M_{BTE1}$, $M_{ITE}$, $WLR_1$, $WLR_2$), e.g. optimized for a number of different listening situations. The BTE-part further comprises a configurable signal processor (DSP) adapted to access the memory (MEM) and for selecting and processing one or more of the electric input audio signals and/or one or more of the directly received auxiliary audio input signals, based on a currently selected (activated) hearing aid program/parameter setting/(e.g. either automatically selected based on one or more sensors and/or on inputs from a user interface). The processor (DSP) provides an enhanced audio signal (e.g. processed to compensate for the particular user's hearing impairment). The processor (DSP) comprises e.g. the user identification processor (ID-PRO) according to the present disclosure providing a user identification signal indicating whether or not, or with what probability, the person currently wearing the hearing device is the particular user.

In the embodiment of a hearing device (HD) of FIG. 8, the ITE part comprises the output unit in the form of a loudspeaker (receiver) (SPK) for converting an electric signal to an acoustic signal. The ITE-part also comprises a (second) input transducer ($M_{ITE}$, e.g. a microphone) for picking up a sound from the environment (as well as unintentionally from the output transducer (SPK)). The ITE-part further comprises a guiding element, e.g. a dome or ear mould, (DO) for guiding and positioning the ITE-part in the ear canal of the user.

The hearing device (HD) exemplified in FIG. 8 is a portable device and further comprises a battery (BAT), e.g. a rechargeable battery, for energizing electronic components of the BTE- and ITE-parts. The hearing device of FIG. 8 may in various embodiments implement the embodiments of a hearing device shown in FIGS. 3, 4A, 4B, 5, 6, and 7.

In an embodiment, the hearing device, e.g. a hearing aid (e.g. the signal processing unit SPU), is adapted to provide a frequency dependent gain and/or a level dependent compression and/or a transposition (with or without frequency compression) of one or more frequency ranges to one or more other frequency ranges, e.g. to compensate for a hearing impairment of a user.

Figure 9A:
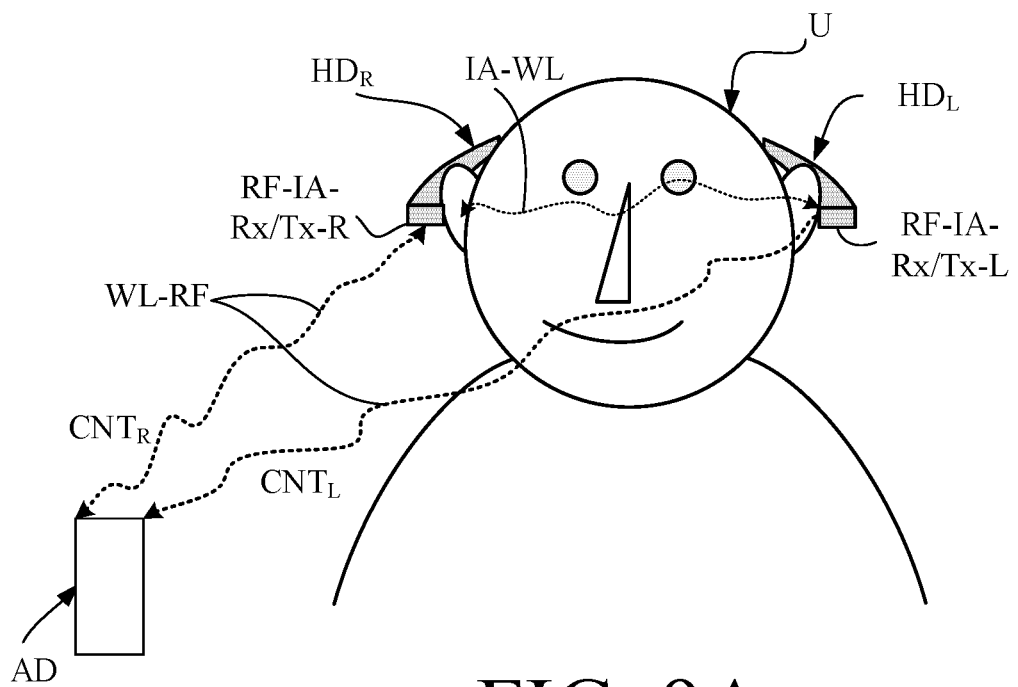
FIG. 9A shows a use case of a binaural hearing system comprising left and right hearing devices and an auxiliary processing device according to the present disclosure.
Figure 9B:
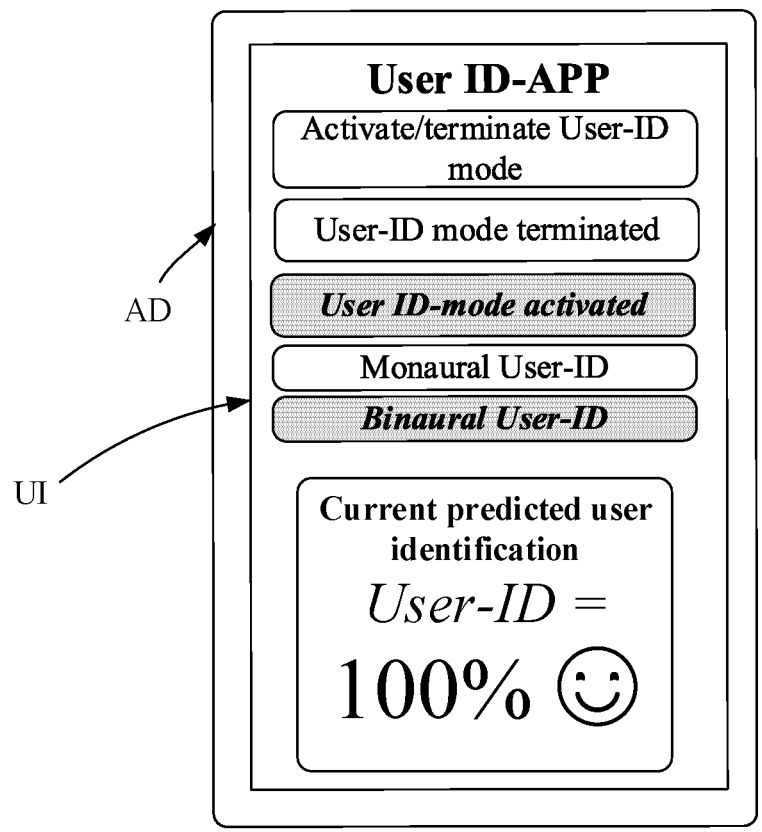
FIG. 9B illustrates a user interface implemented as an APP according to the present disclosure running on the auxiliary device.

FIG. 9A shows a use case of a binaural hearing system comprising left and right hearing devices ($HD_L$, $HD_R$) and an auxiliary processing device (AD) according to the present disclosure. FIG. 9A, 9B show an exemplary application scenario of an embodiment of a binaural hearing system according to the present disclosure. FIG. 9A illustrates a user (U) wearing a binaural hearing aid system ($HD_L$, $HD_R$) and an auxiliary device (AD). FIG. 9B illustrates the auxiliary device (AD) running an APP for configuring the user identification mode ('User ID-APP'). The APP is a non-transitory application (User ID-APP) comprising executable instructions configured to be executed on the auxiliary device (AD) to implement a user interface (UI) for the hearing device(s) ($HD_L$, $HD_R$) or the hearing system. In the illustrated embodiment, the User ID-APP is configured to run on a smartphone, or on another portable device allowing communication with the hearing device(s) or the hearing system.

FIG. 9B illustrates a user interface (UI) implemented as an APP according to the present disclosure running on the auxiliary device (AD). The user interface (UI) comprises a display (e.g. a touch sensitive display). Via the display of the user interface, the user can interact with the hearing system and hence control functionality of the system. The illustrated screen of the 'User ID-APP' allows the user to activate (or terminate) a user identification mode (according to the present disclosure), cf. grey shaded 'button' denoted 'User ID-mode activated' (the grey shading indicating that the mode is activated). The screen further allows the user to choose between 'Monaural User-ID' and 'Binaural User-ID' (where Binaural User-ID is activated in the example). Monaural and Binaural User-ID (user identification) refer to user identification based only on local input signals (monaural) and user identification based on input signals (regarding user identification according to the present disclosure) from both sides of the head (binaural). The screen informs the user about a current status of the user identification User-ID=100% (which is indicated to be satisfactory by the smiley). A consequence of a positive user verification may e.g. be that a smartphone running the user ID APP may remain unlocked while it is connected to the hearing devices.

The auxiliary device (AD) comprising the user interface (UI) is preferably adapted for being held in a hand of a user (U).

In the embodiment of FIG. 9A, wireless links denoted IA-WL (e.g. an inductive link between the hearing left and right assistance devices) and WL-RF (e.g. RF-links (e.g. Bluetooth) between the auxiliary device (AD) and the left ($HD_L$) and between the auxiliary device (AD) and the right ($HD_R$), hearing device, respectively) are indicated (implemented in the devices by corresponding antenna and transceiver circuitry, indicated in FIG. 9A in the left and right hearing devices as RF-IA-Rx/Tx-L and RF-IA-Rx/Tx-R, respectively).

In an embodiment, the auxiliary device (AD) is or comprises a remote control for controlling functionality and operation of the hearing device(s). In an embodiment, the function of a remote control is implemented in a smartphone, the smartphone possibly running an APP allowing to control the functionality of the audio processing device via the smartphone (the hearing device(s) comprising an appropriate wireless interface to the smartphone, e.g. based on Bluetooth or some other standardized or proprietary scheme).

In an embodiment, the hearing system, including the user interface (UI), is configured to allow a user to terminate a User-ID mode (by clicking button Activate/terminate User-ID mode).

One-shot learning (e.g. using a single sentence of e.g. 10 sec (or less) length) may be used as a simple basis for voice recognition, e.g. identification of a user's voice based on its (e.g. spectral) characteristics. Such short exemplary segments of a person's voice may not be able to reflect all acoustic environments. Hence, data augmentation may be added (e.g. in case the user identification is expected to be used in many different acoustic environments). Data augmentation may comprise adding noise, filtering, such as (adding) reverberation, spectral change, altering the voice to mimic raised effort or whispering. Furthermore, the speed of the utterance may be altered. In order only to verify the speaker and not learn the sentence, it is suggested to shuffle the different segments of the sentence in time.

A neural network for speaker verification could be based on pre-processed features such as MFC coefficients (MFC=Mel-frequency cepstrum). An utterance may e.g. be recorded by an audiologist. Speaker verification may e.g. be used as part of an own voice detector or in order to identify a specific person and change the amplification pattern (of a hearing device) according to this specific person. Identification of a particular user (based on voice characteristics may be performed according to the method describe din the following).

In an embodiment, re-training of the neural network for the person's utterance is provided.

A way to avoid re-training may be to use a neural network to learn features for each person's voice, such that a distance measure between voice features of the same person is small, while the distance between voice features of different persons is much higher. Such a network should be able to generalize such that voice features between a person not being part of the trained network still has a small voice feature distance between the voice sample and a new voice sample of the same person. Such a network is called a Siamese network, and a typical loss function for this type of problem is called a triolet loss function.

Vocal commands, customer identity verification, biometric authentication, or forensic expertise are possible applications among many others which require automatic speaker recognition (e.g. using an algorithm). The prediction or output of the algorithm is a label defined in a way to retrieve the speaker's identity. These algorithms belong to the family of classifiers where the output is a nominal or discrete variable. Speaker recognition is therefore a classification task, a sub-domain of supervised machine learning (cf. e.g. [Chollet & Allaire, 2018], p. 6) and its principle is illustrated in FIG. 10A.

Figure 10A:
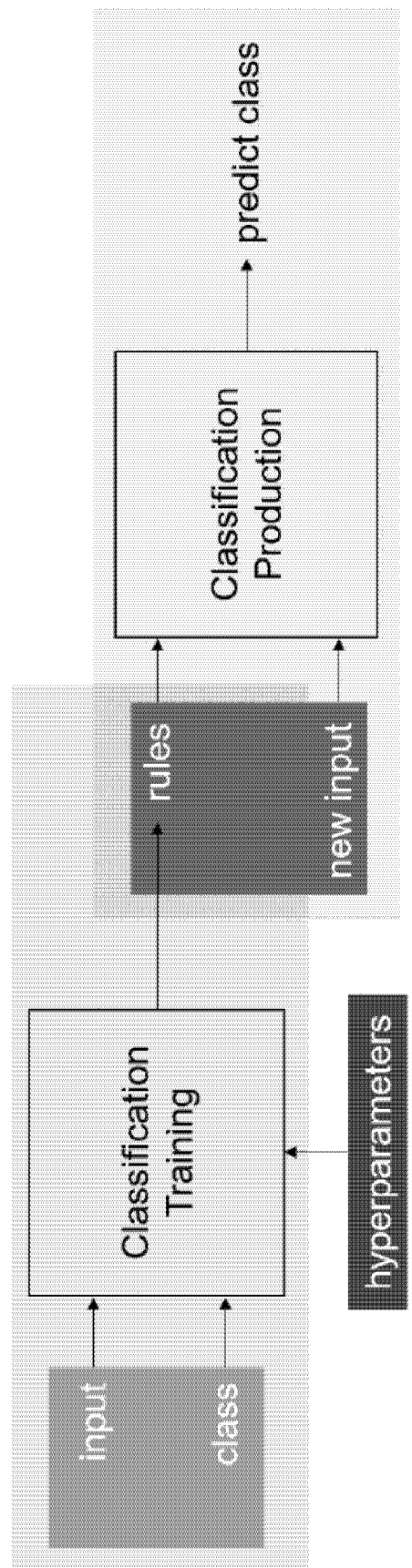
FIG. 10A illustrates the general principle of classification with a training phase (left) and a production phase (right), wherein the training phase produces a set of rules based on each input associated to an a priori known output (e.g. a class label), and wherein these rules are subsequently used in the production phase with new input data to predict the class they belong to, and FIG. 10B illustrates the difference between (top part) speaker identification providing the speaker identity of the current speaker among a multitude of known speakers, and (bottom part) speaker verification providing an indication of whether or not, or with what probability, the person currently speaking is the known target speaker (particular user), FIG. 11 schematically illustrates a speaker verification process based on a single speech utterance from the enrolment (left), augmentation prior training (middle), and test (or 'production') with running speech to predict the class (right)

FIG. 10A illustrates the general principle of classification with a training phase (left) and a production phase (right), wherein the training phase produces a set of rules based on each input associated to an a priori known output (e.g. a class label), and wherein these rules are subsequently used in the production phase with new input data to predict the class they belong to. The first phase consists of training the classification algorithm, i.e. parameters will be optimized to reduce the error between true and predicted classes. The training dataset links for each sample one output defined as the true value. Input data can be images, sounds, measures, sensors data . . . , and they are usually arranged into a feature matrix. Input data are defined by their cardinality (the number of observations or matrix rows) and dimensionality (the number of parameters or matrix columns). The output, which is also called target, is a label of a predefined class in the form of a categorical variable.

For speaker recognition, the input data are sound files from different speech signals, prepared in a data format that can be used by the classifier. The output data are the speaker identification labels. The classifier will deliver a set of rules at the end of the training phase to find the association between input and output data. This is a back-and-forth process, where the algorithm parameters are tuned to improve the output prediction, i.e. it aims at increasing the percent of correctly classified samples and at reducing the loss function. It is also possible to tune some hyperparameters that must be a priori defined. They can be used to control some aspects of the learning process like the learning rate.

During the training phase, a mathematical model is fitted to the data. This model is thereafter applied on new samples to make a prediction. In the example of male vs. female speaker classification, a simple rule, based on the fundamental frequency, could be used to retrieve the speaker's gender. Firstly, a training dataset with gender-labelled speech files is used to estimate the best frequency able to separate male from female voices. These data fit a mathematical model: the logistic regression. The binary outcome variable (gender) is expressed as a function of a continuous variable (fundamental frequency). The logistic regression gives the probability that the speaker is from a given gender for any possible fundamental frequency.

In the production phase, the algorithm gets new input data without any label. Applying the rules from the training phase to this new data will generate a prediction. This predicted output is a categorical variable, which belongs to one of the initial possibilities. Classifiers can be quite accurate if they have enough training data and by using high performing algorithms like deep learning.

An Example of Identification of a User's Voice. Augmented One-Shot Learning:

The present example deals with speaker recognition to retrieve who is talking in a given situation (not what is actually being uttered).

Ease of understanding different speakers for a hearing impaired person is not equal. Some might speak too soft, others too loud. A hearing device (e.g. a hearing aid) user may target a person of interest (e.g. a teacher in a class room) and record a short time segment (e.g. 10s) of clean speech with the desired correction (louder, softer, brighter . . . ). Speaker verification may be modelled and the parameters mad available to the user' hearing device. Each time the 'target speaker' is retrieved within the incoming signal, desired changes to processing parameters are automatically applied. A relevant scenario could be that the hearing device user has difficulties with a given teacher (whose classes are regularly attended by the hearing device user), family member, colleague, or presenter, etc. Using the present concept, only a single model is needed, and the hearing device will adapt itself automatically to thereby enhance the hearing device user's perception, e.g. speech intelligibility.

The model may be implemented by machine learning methods. The present technique can target multiple speakers, including the hearing device user him- or herself, and apply a personalized change to the hearing device processing. When the method is used to identify the voice of the hearing device user to provide a user identification signal, the scheme can be applied for authorizing the user to access a restricted service or object. Examples hereof are e.g. authorization vis-à-vis a financial service (e.g. bank) or for allowing access to an otherwise locked item, e.g. a vehicle, or a building, or container, etc. The scheme is illustrated in FIG. 11.

Figure 10B:
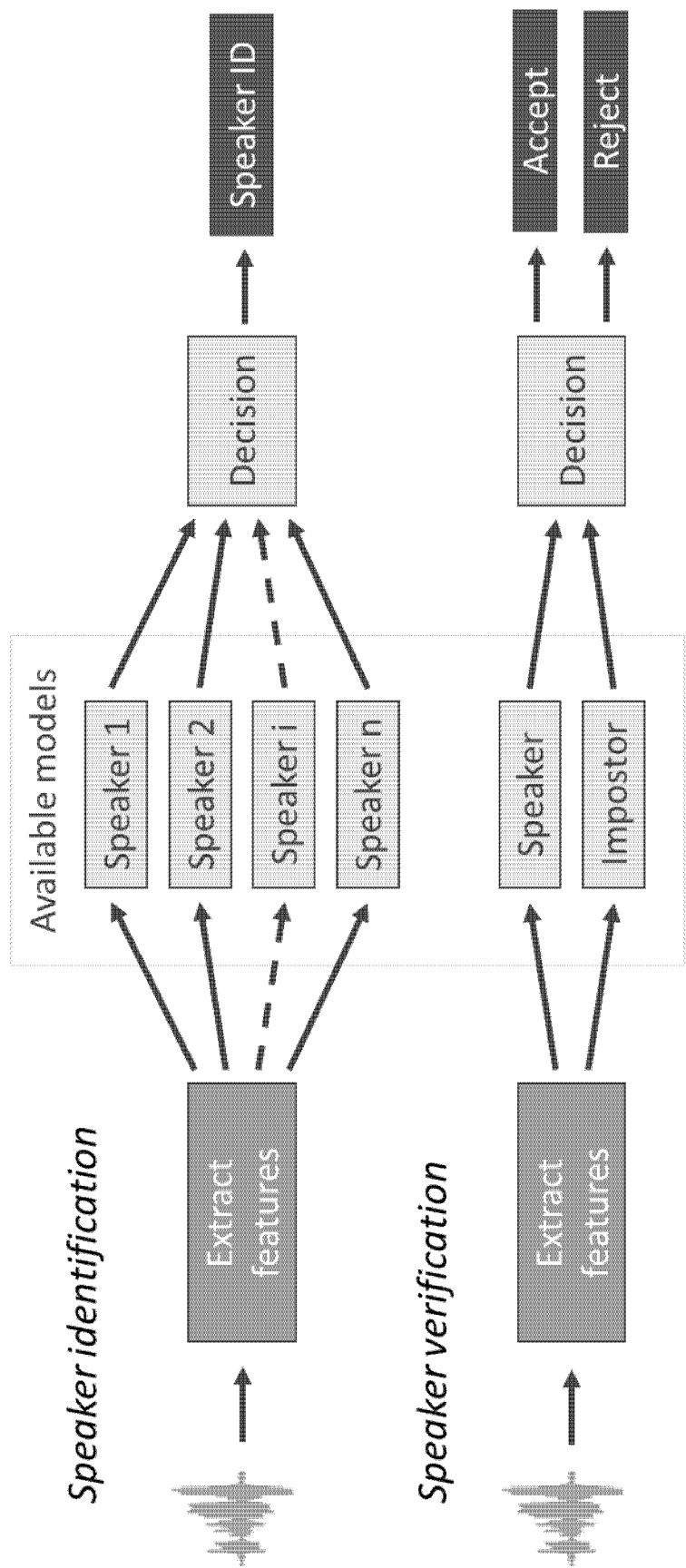

FIG. 10B illustrates the difference between the terms (top part) 'speaker identification' and (bottom part) 'speaker verification'. Speaker verification (top part of FIG. 10B) provides the speaker identity (Speaker ID) of the current speaker among a multitude of known speakers (Speaker 1, Speaker 2, . . . , Speaker i, . . . , Speaker n). The identification is based on extraction of (e.g. spectral) features from the current input signal (e.g. picked up by one or more microphones of the hearing device) and comparing the extracted features with feature models for each of the known speakers, and based on the result of the comparison, take a decision (e.g. based on a distance criterion) to provide the identity of the current speaker (Speaker ID). Speaker verification (bottom part of FIG. 10B) provides an indication, e.g. binary (Accept or Reject) or probabilistic, of whether or not, or with what probability, the person currently speaking is the (one) known target speaker ('Speaker'=particular user). The speaker verification process is similar to the speaker identification process as described above. In speaker verification, only one speaker model is present (e.g. the target speaker ('Speaker'), e.g. the (particular) user). The task of the speaker verification process is to decide whether or not the current speaker is the target speaker in an acoustic environment possible comprising noise and occasional other speakers ('Imposter's, denoted IMP in FIG. 11).

Figure 11:
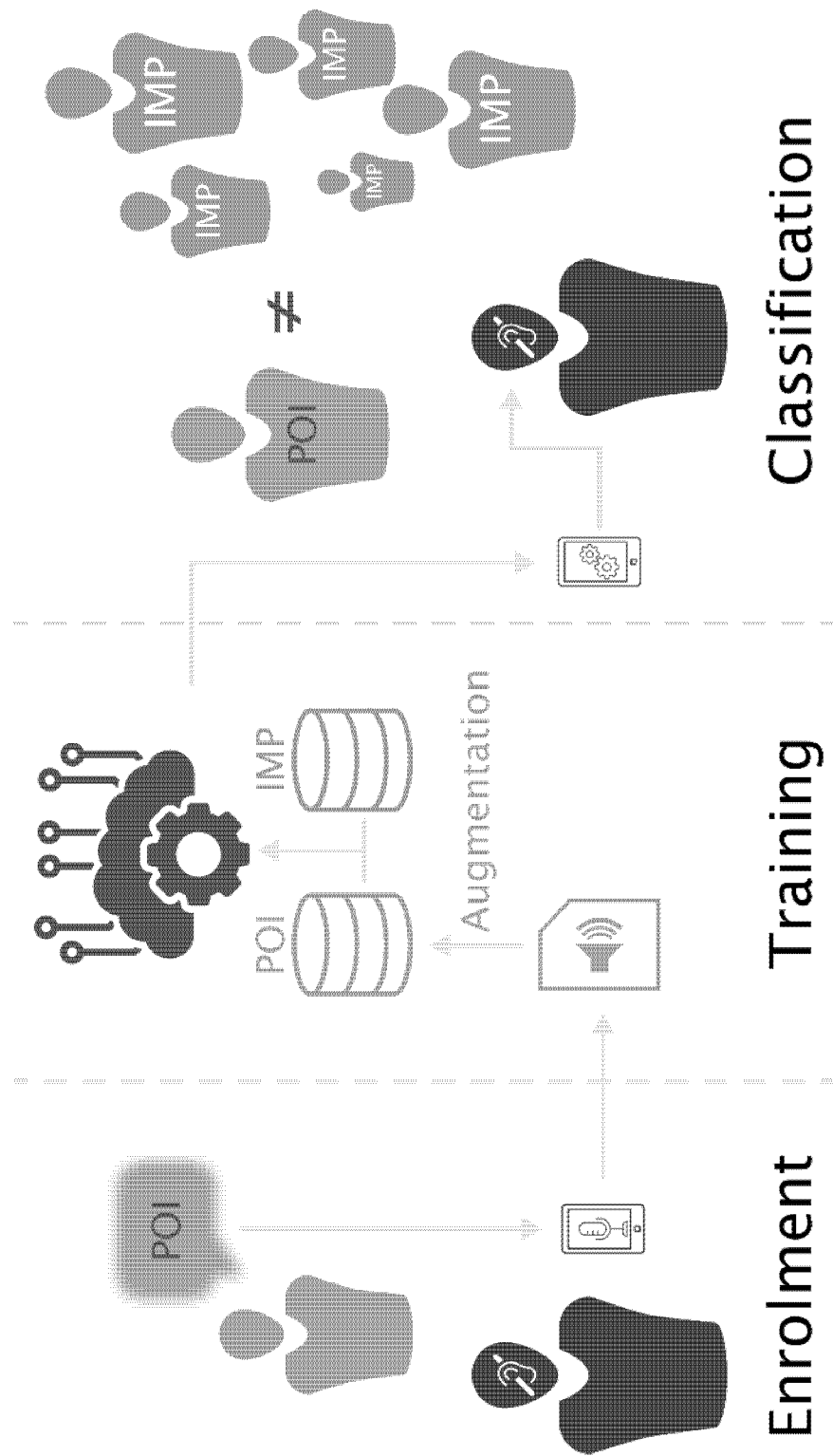

FIG. 11 schematically illustrates a speaker verification process based on a single speech utterance from the enrolment (left), augmentation prior training (middle), and test with running speech (right). The aim is a text-independent discrimination between person of interest (POI) and different other persons (impostors (IMP)).

Automatic speaker recognition takes advantage of recent advances in machine learning especially in the field of deep learning. While performance is improved with deep learning algorithms on standardized databases, some constrains might arise in applications where the training data have a short duration and show limited intra-speaker variability. The present disclosure proposes to evaluate the effect of data augmentation, based on a single utterance from the target speaker, with different deep learning architectures for text-independent speaker verification.

A model which is (1) robust to environment and natural speech variations and (2) able to produce a training dataset based on a single speech utterance is provided.

Different signal processing algorithms within hearing devices are designed to improve listening experiences especially for speech-in-noise situations. While speech-in-noise offers a clear and obvious distinction between wanted and unwanted signals, speech-in-speech situations constitute more challenging listening environments. A hearing device capable of tracking a target speaker may offer interesting applications especially for speech-in-speech situations. The hearing device may be adapted to retrieve the target speaker (e.g. the user him- or herself) and adjust some processing characteristics (e.g. amplification) of the hearing device in dependence thereof or to contribute to a biometric identification of the user. As illustrated in FIG. 11, the hearing device user provides a short speech utterance (e.g. picked up by a smartphone or the hearing device microphones, when located in close proximity of the target speaker (including when the user him- or herself is the target person (POI)) labelled with the target speaker (cf. left part of FIG. 11 denoted 'Enrolment'). This short utterance is augmented and used to train a model (cf. middle part of FIG. 11 denoted 'Training') that will later retrieve the target speaker (cf. right part of FIG. 11 denoted 'Classification').

In an embodiment, the hearing device user is the 'person of interest' (POI). The user's own voice may need a specific processing (e.g. less amplification) to improve its perception, and/or identification of the user based on the user's voice (and as proposed in the present disclosure in combination with characteristics of the acoustic system (hearing device) and its placement on the user to provide a 'biometric identification' of the particular user for whom the hearing device is specifically adapted. The training phase for the particular user of the hearing device may be easier to control, i.e. a speech utterance for training purposes may be produced during a fitting session under the instruction of an audiologist. Once the training phase is finished, then the system marks each signal segment recognized as speech from the hearing device user and apply a pre-defined and specific change to amplification and/or provides a voice identification input (cf. e.g. VID in FIG. 4B) to a user identification processor.

Both use cases share common requirements.

The training sample is a single, short, clean speech utterance. Recording conditions are close to optimal, i.e. absence of speech production stress, emotional load, background noise, and use of the native language.

Differences between training and test conditions. The training material is just a snapshot of one speech utterance. In daily life situations (i.e. the test conditions), within speaker speech production differences are expected, e.g. text, spoken language, production effort (loudness and speed), and speaking style (whisper, sing, shout, various emotions).

Test data should present variations in environmental acoustical conditions, mainly defined by the type of background noise, the signal-to-noise ratio, and the room reverberation.

No changes in the transmission channel are foreseen as the device hardware and analog-to digital converter remain invariant over time.

The current scenario is therefore a text-independent speaker verification. In an embodiment, speaker verification, based on a specific key word, is provided (e.g. for user identification purposes (VID, UID) according to the present disclosure). The scenario illustrated in FIG. 11 is defined for a single person of interest (POI) (e.g. the particular user of the hearing device) which should be retrieved from many impostors (IMP). The speaker verification may use feedforward architectures with increasing complexity. The classification task is defined as speaker verification, when the unknown speaker identity has to be retrieved. The verification, or authentication, can be used to grant access to secured applications. These applications will check if one input matches one output like a behavioural biometric identifier. The classification produces an output with two possibilities: accept claimed ID or reject it.

Figure 12:
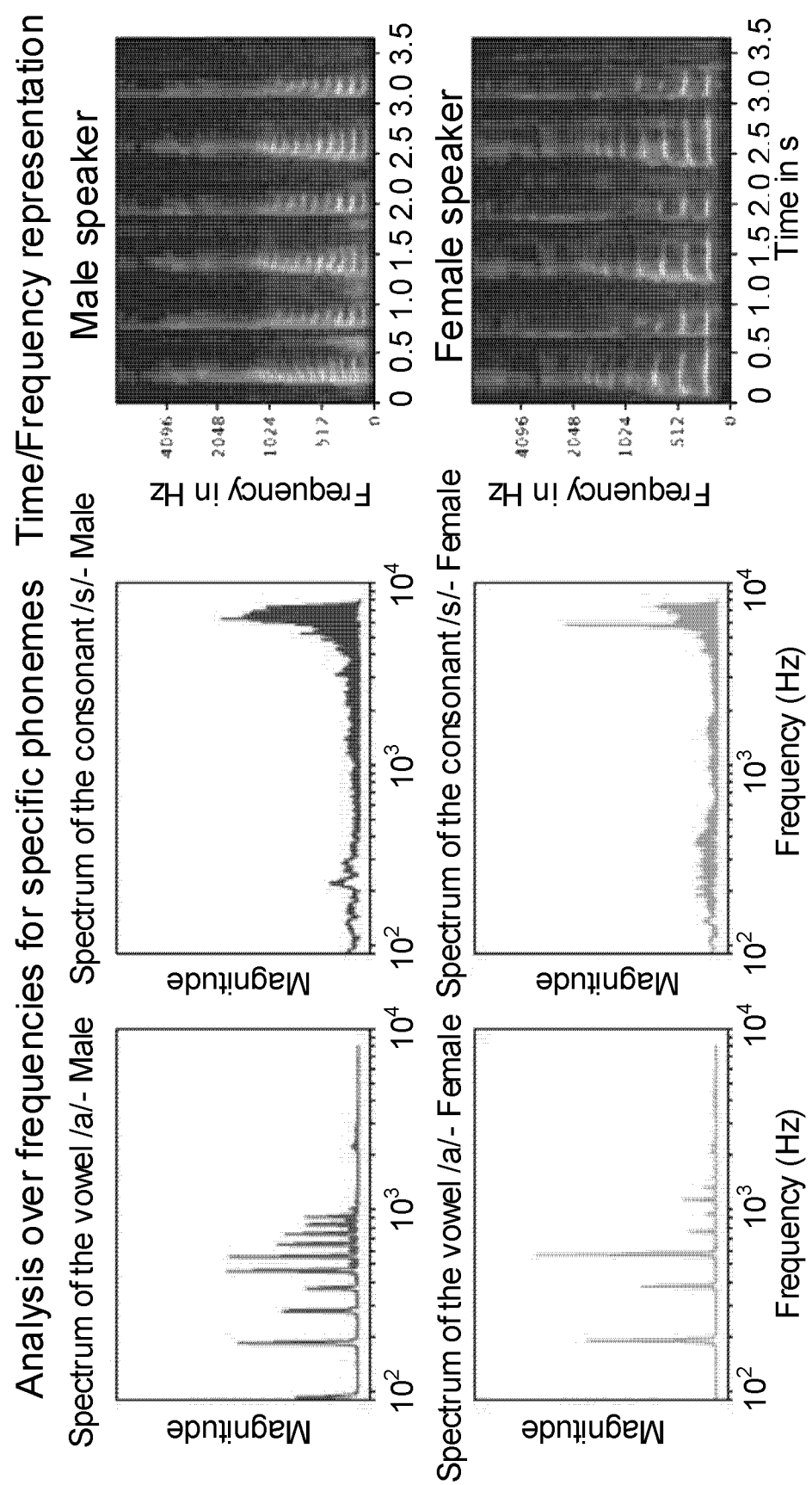
FIG. 12 illustrates exemplary characteristic elements of an acoustic signature of a human speaker.

Differences in energy localization on the frequency scale or harmonicity can't be visualized on the (time-domain) waveform representation. The signal must be transformed into the frequency domain, e.g. with a Fourier Transform (FT). FIG. 12 illustrates the spectral differences between two phonemes with two speakers: one vowel /a/, with distinctive fundamental frequency $f_0$ and the associated discrete formants distribution, and one consonant /s/, with the friction noise in high frequencies. FIG. 12 illustrates exemplary characteristic elements of an acoustic signature of a human speaker. The left part of FIG. 12 shows exemplary frequency spectra (magnitude versus frequency from 100 Hz to 10 kHz) of the vowel /a/ for a male (top) and a female (bottom) voice. The middle part of FIG. 12 shows exemplary frequency spectra (magnitude versus frequency from 100 Hz to 10 kHz) of the consonant /s/ for a male (top) and a female (bottom) voice. The right part of FIG. 12 shows respective spectrograms (time-frequency representations) of the vowel /a/ for a male (top) and a female (bottom) voice. The spectrograms illustrate a time dependence of the respective spectra (horizontal axis is time t between t=0 and t=3.5 s, and the vertical axis is frequency f between 0 and 8 kHz). A concentration of frequency content below 1 kHz is apparent and the difference between the male and female spectra (as also appears from the respective spectra of the left part of FIG. 12) is clearly reflected in the spectrograms. For the consonant /s/, the friction of the air within the vocal tract produces a high frequency noise between 7 and 10 kHz. The shape of the noise spectrum makes the difference between the speakers. For the vowel /a/, f0 depends on the speaker's vocal folds vibration speed. The magnitude of the formant depends mainly on the volume of the resonating cavities. These cavities are modulated by the tongue position, i.e. height and position relative to the front and back of the mouth will affect the first and second formants. The peaks of energy are located at different frequencies for each speaker. The vowel /a/ has a $f_0$ about 00-110 Hz for the male speaker and about 230-250 Hz for the female speaker. The frequencies of the formants in this illustration are integers from the $f_0$. These characteristics are interesting for speaker recognition, as they vary with the vocal tract morphology (and thus individual persons). Vowels, which show less variation over time than consonants, possibly making vowels prone to contain more variation between speakers, and hence particularly interesting to discriminate speakers.

There are basically two approaches to extract features from a sound file for speaker recognition: (1) computes key statistics, like pitch or formant contour, over the entire signal (long term or utterance-level features) or (2) analyse short extracts from the speech spectrogram. Long-term features are not so efficient because they cannot precisely catch the variation of speech signals over time and they are very sensitive to the production context. Speech applications, like speaker or speech recognition algorithms, could instead benefit from time-frequency features extracted from a spectrogram or Mel-Frequency Cepstral Coefficients (MFCC).

Figure 13:
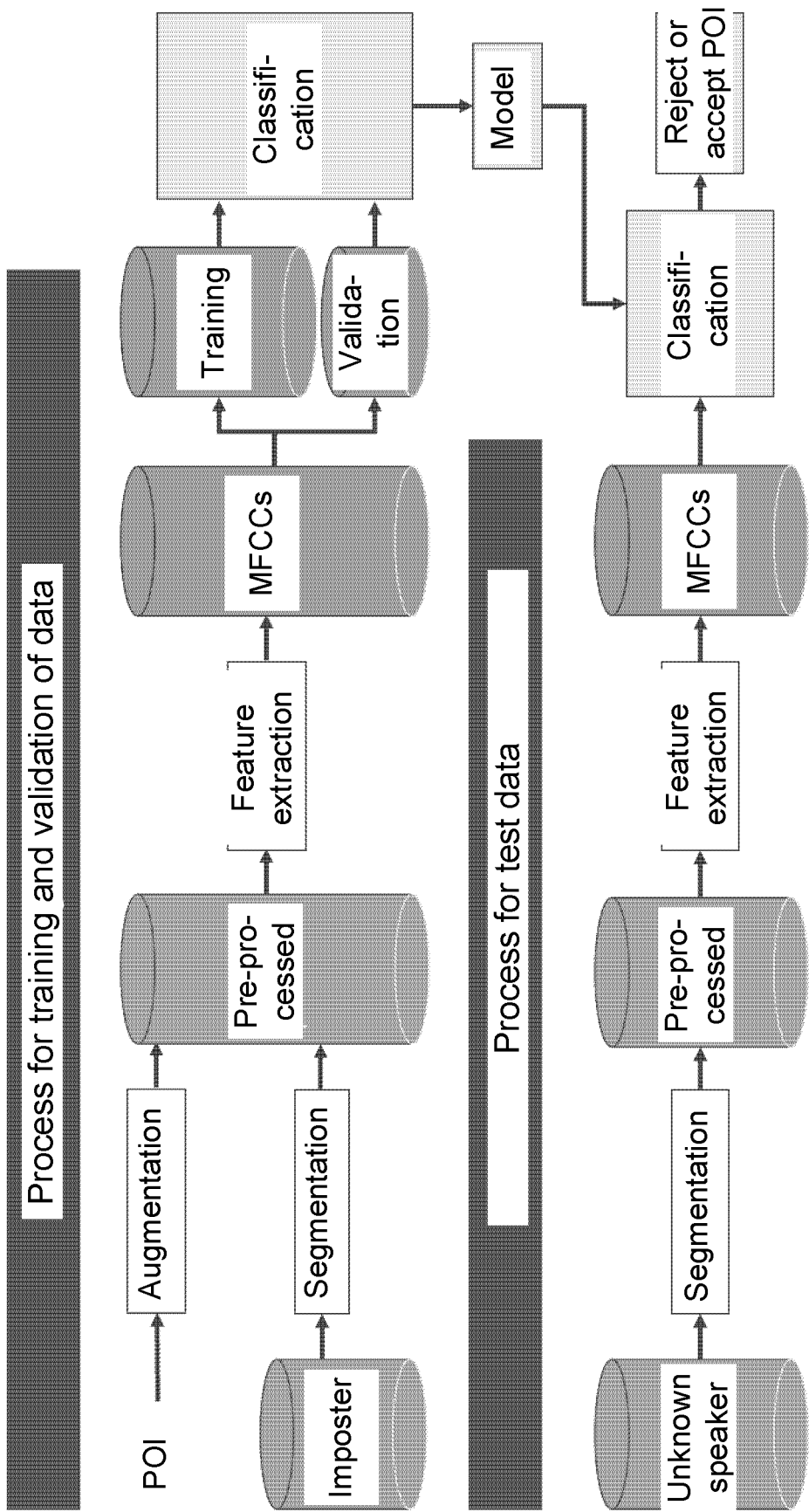
FIG. 13 illustrates a second embodiment of a training and operational use model of an automatic speaker verification (ASR) process.

FIG. 13 illustrates a second embodiment of a training and operational use model of an automatic speaker verification (ASR) process. FIG. 13 illustrates a binary classification of a person of interest (POI, a target speaker, possibly the particular user) as yes or no to the current speaker being the person of interest ('Reject of accept POI'). The top part of FIG. 13 illustrates the training and validation process, where training data originate from clean speech recordings. The bottom part of FIG. 13 illustrates the test phase, where test data represent a wider range of degraded acoustical and speech conditions. A first stage is to take raw audio signals, convert them to the selected sampling frequency, and segment them into shorter utterances of the equal duration. The duration as well as the sampling frequency must be clearly defined and are preferably kept constant. Data augmentation (increased variability) is applied to the selected clean speech sample to generate the training and validation data representing the target speaker. Data augmentation may e.g. be performed by 'distorting' the original 'clean speech signal', e.g. by filtering (e.g. low pass, band pass, or high pass, e.g. hiding a fundamental frequency or formants), applying reverberation, sub-segmentation (e.g. in 5 parts) and shuffling of subsegments, mixing with noise, etc. Generalizing the performance to new data may be challenging, in cases where only one speech utterance is available. This risk must be mitigated to avoid overfitting during the learning process. The data augmentation may be scripted with random variables (e.g. noise type, SNR, bandwidth . . . ) to avoid systematic patterns in the training dataset. FFT is applied to short segments of the time domain audio signal. A 'mel' transformation on the frequency scale and a log scale on the amplitude is applied to reflect the sensitivity of the human auditory system. Subsequently, the MFCC (Mel-Frequency Cepstral Coefficients) are extracted from each audio sample (e.g. of the augmented data sets) for the target speaker (POI) and the impostors (IMP) in the training and test repositories. This process allows a lot of freedom in extraction parameters, like the number of coefficients, removal of the $1^{st}$ coefficient, the hop length, and the scaling approach. Finally, the data for the target speaker and all the impostors in a training matrix are combined with its associated test vector. The final data for a single experiment should include at least a matrix and vector for the training/validation and one for the test. FIG. 13 shows the data flow from the raw audio files to prediction ('Reject of accept POI') with the test set. The output label is linked to each file name during all the process.

Network training: Different deep learning architectures can be used to train a speaker recognition, e.g. increasing complexity from a simple fully connected network to a 1D convolutional network with a fully connected network with 2 hidden layers.

Tuning parameters of the classifier: The dimensions and parameters should preferably be adapted to the data format and number of possible outcomes. Hyperparameter tuning for the fully connected network includes optimization algorithms, batch sizes, learning rate, regularization strength, dropout rates, and the number of units for each hidden layer. The convolution stage is defined by the number of kernels, their width, stride, padding, and the pooling strength. As there are many variables within each model, the selection process must be documented to keep a good overview and history of each training run.

Each trained model provides the accuracy and loss for the training and for the validation. Model selection is based on the last run with the validation set so that the loss is minimized, and the accuracy maximized. If the decision doesn't give a clear winner, then the history of the training should be visualized to see which model gives the most consistent results.

It is, important to ensure that training a model produces reproducible results from one run to another. The learning process will randomly initialise the parameters.

Binary classifiers ('Reject of accept POI') can be evaluated with a confusion matrix. The matrix has the counts of actual events (true values) in the columns and the predicted events in the rows. There are four possible options. Two of them stand for a match between actual and predicted outcome: true positives (TP, predicted and actual events are true) and true negative (TN, predicted and actual absence of events are true). The other two possibilities stand for a mismatch between actual and predicted outcomes: false positive (FP, predict the event but event is not present) and false negative (FN, predict absence of event but event is present). In an embodiment, the Matthews correlation coefficient (MCC) is applied to the observations of the confusion matrix. The Matthews correlation coefficient takes the 4 observations into account as well as any potential imbalance in the test data:

$$MCC = \frac{TP \times TN - FP \times FN}{\sqrt{(TP + FP)(TP + FN)(TN + FP)(TN + FN)}}$$

The MCC formulae returns a value between −1 and 1. A perfect prediction of both classes equals a coefficient of 1, random predictions have a coefficient of 0, and a total discrepancy between actual and predicted value will return a coefficient of −1. It has also another advantage as it does not rely on the a priori defined value for positive or negative event.

A Single Fully-Connected Neural Network

Figure 14A:
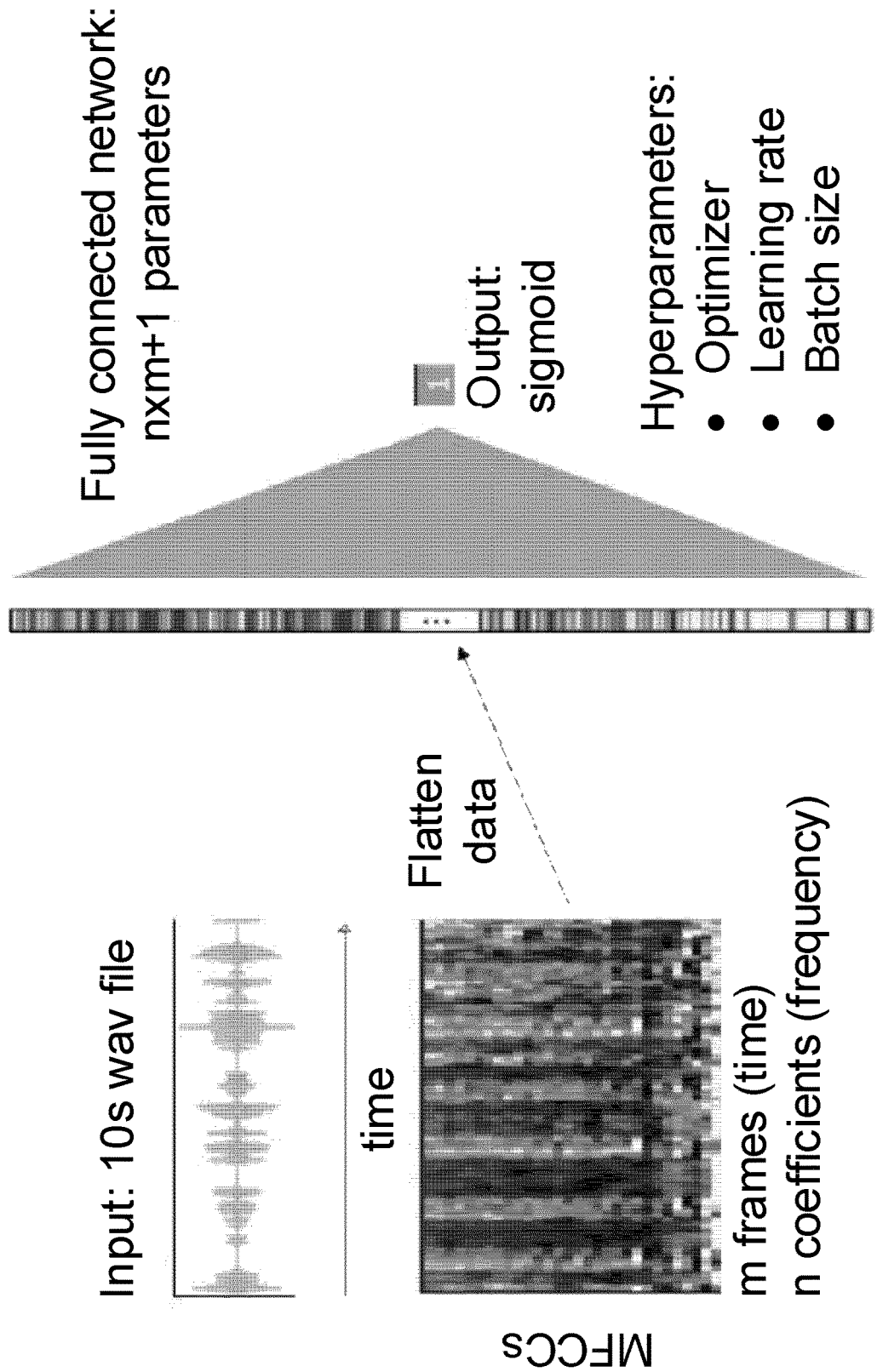
FIG. 14A illustrates single fully connected network, where input data is the MFCC sample, and the sigmoid activation function is used in the output layer for binary outcome measures.

A single fully connected network connects all the input data to a single output unit activated by a sigmoid function. This version, which is the simplest version of any network, may serve as a baseline. Adding complexity to the next architecture can be only justified if the baseline accuracy is improved. At this stage, the performance of the model with different optimizers e.g. including root mean square propagation 'RMSProp', may preferably be compared. The learning rate as well as the batch size are hyperparameters that may be tuned as well. This is illustrated in FIG. 14A.

Figure 14B:
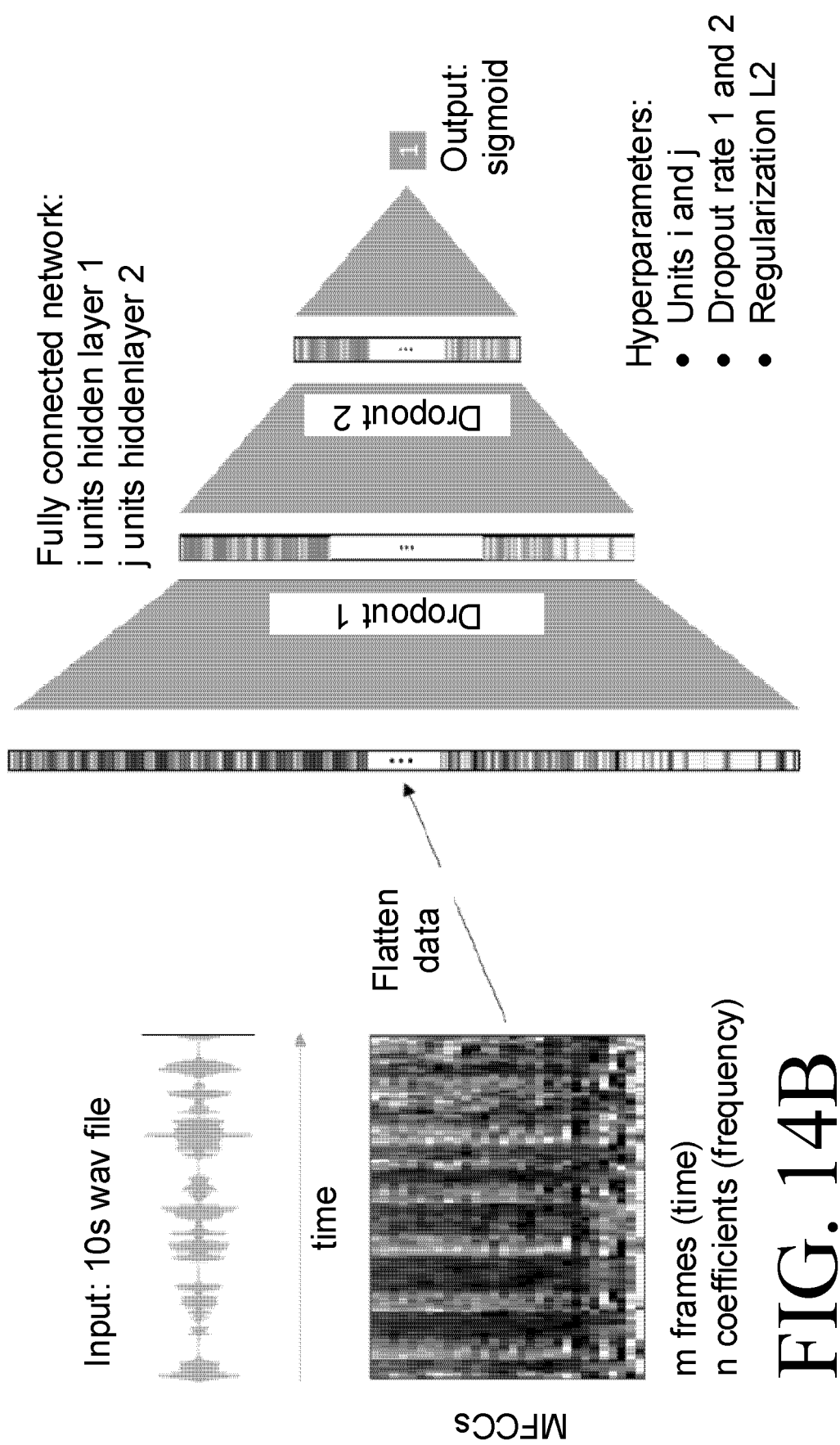
FIG. 14B illustrates fully-connected neural network with two hidden layers, where input data is the MFCC sample, and the sigmoid activation function is used in the output layer for binary outcome measures.

A Fully-Connected Neural Network With Two Hidden Layers:

A fully-connected neural network with two hidden layers activated with rectified linear unit functions. Hyperparameter tuning will handle the size of the hidden layers, the dropout rate, the L2 regularization strength, and the learning rate. This is illustrated in FIG. 14B.

A Neural Network Comprising Two Layers with 1D Convolution.

Convolutional neural networks (CNN) belong to a specific class of deep learning algorithm. It is a supervised machine learning type inspired by human neuronal networks used to solve complex problems. The network can learn to recognize non-linear patterns in the input data after an intensive training phase. CNNs are based on four main operations: convolution, activation function, pooling, and finally classification as output of a fully connected layer.

Figure 14C:
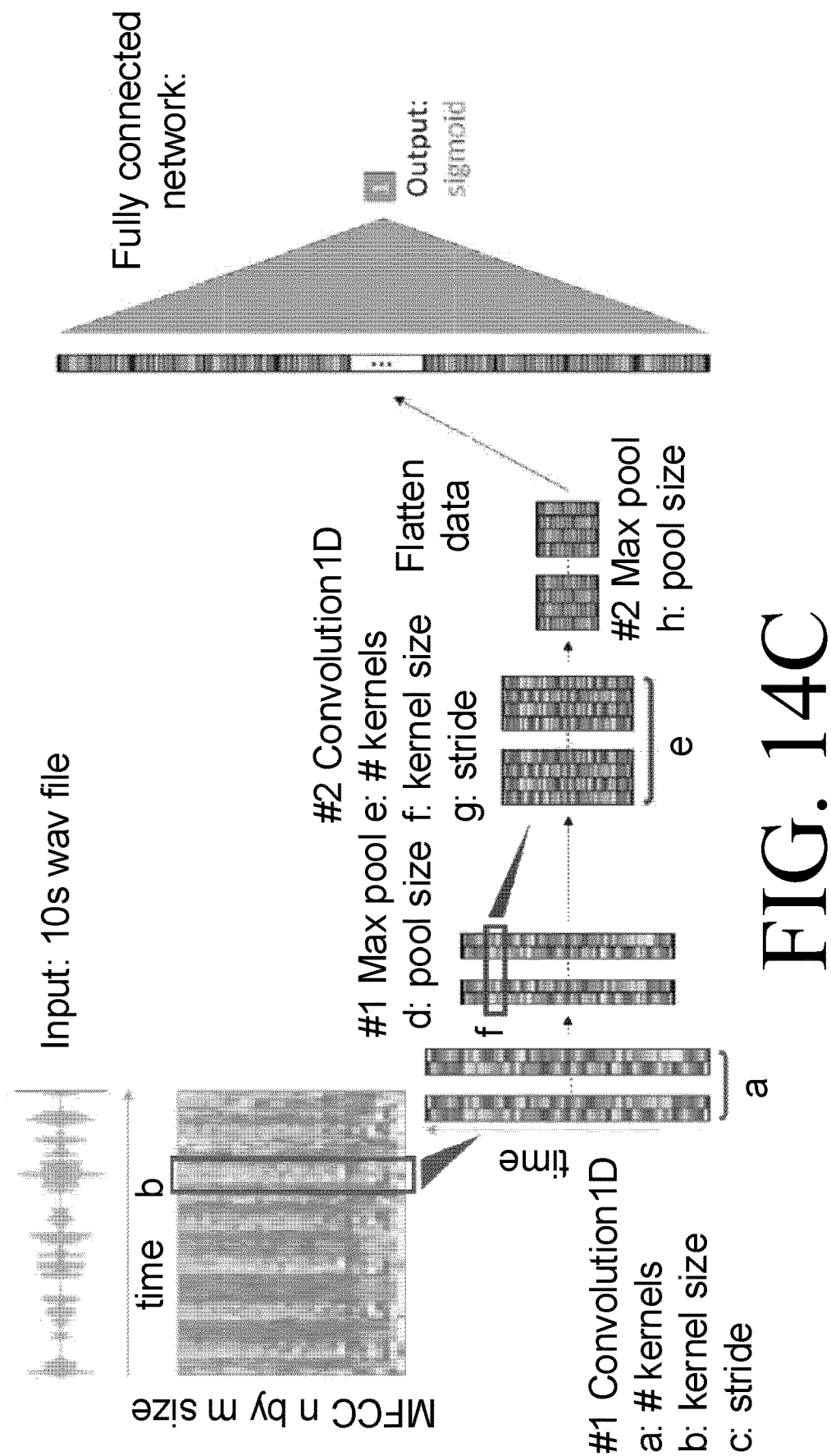
FIG. 14C illustrates a convolution neural network architecture for speaker verification with 2 convolution stages followed by pooling and finally a fully connected network, where input data is the MFCC sample, and the sigmoid activation function is used in the output layer for binary outcome measures.

The exemplary network of FIG. 14C comprises two layers with 1D convolution stages with max-pooling function linked to a single layer fully connected network. Each convolution is followed by a pooling function to down-sample the size of the data. The number of response maps is increased from the first to the second convolution.

A neural network comprising 1D convolutions with 2 hidden layers CNN

Figure 14D:
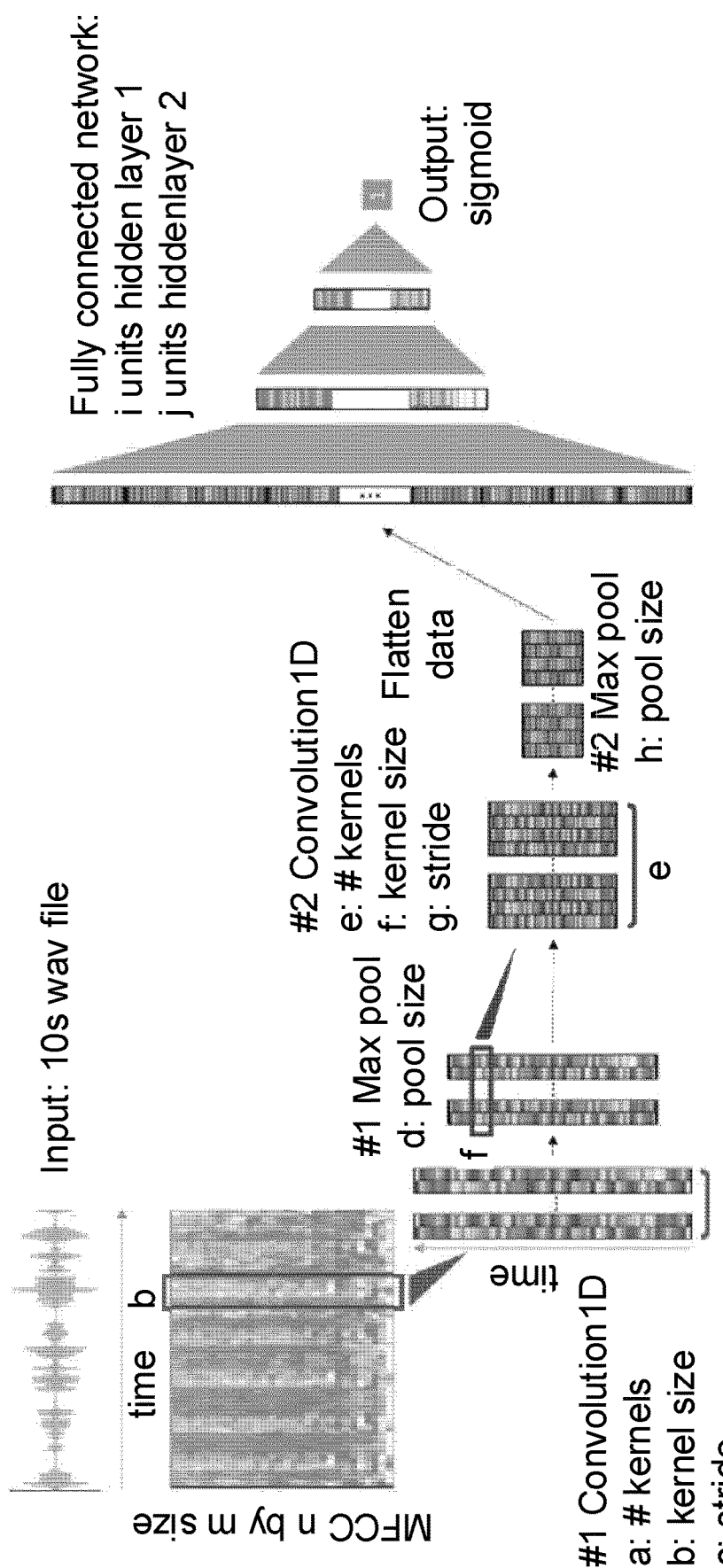
FIG. 14D illustrates a convolution neural network architecture for speaker verification with 2 convolution stages followed by pooling and finally a fully connected network with 2 hidden layers, where input data is the MFCC sample, and the sigmoid activation function is used in the output layer for binary outcome measures.

The network illustrated in FIG. 14D comprises two 1D convolution stages are combined with a 2 hidden-layer connected network. The first convolution is defined by the number of filter (or kernels), their size, the step size between two convolutions, the padding, and the activation function. Each convolution is followed by a down-sampling stage with a pooling function. Hyperparameter will investigate the number of filters at each stage, their width, the stride, and the pooling size. The idea behind the succession of convolutions is to recognize first simple patterns, like lines or areas. In a next convolution layer, the simple patterns are associated to make kernels sensitive to more complex and non-linear patterns.

Sigmoid Output.

The activation of a neuron is modelled with a mathematical function, i.e. the output of the neuron is defined as a function of the input. Different activation functions are available for neuronal networks. Among the most popular activations options, the sigmoid function, inspired by a logistic regression, the tanh function, which is a hyperbolic tangent, and more recently, the rectified linear unit (ReLU).

Figure 15:
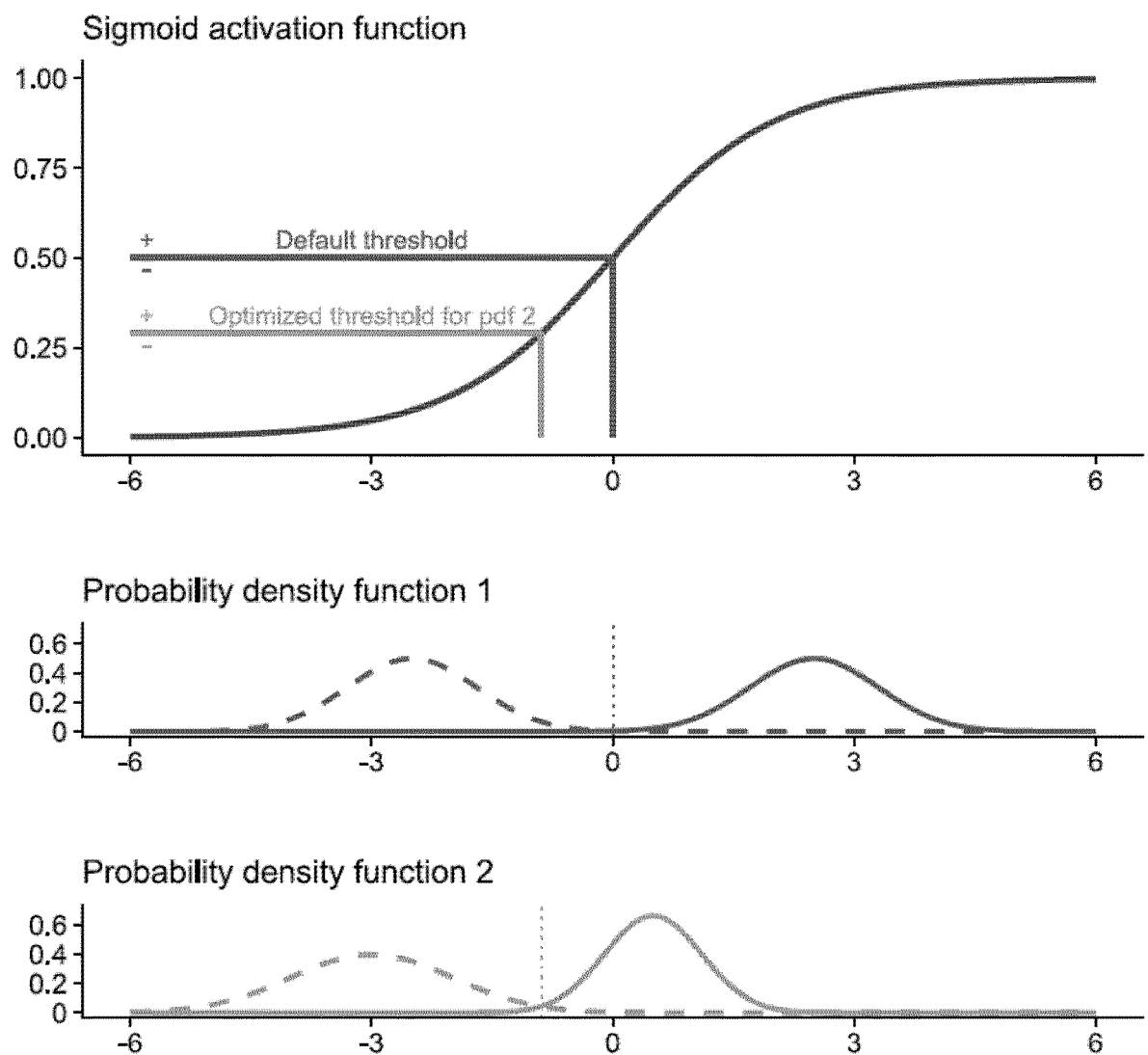
FIG. 15 illustrates classification based on the sigmoid function (top) with two possible data distributions (middle and lower graphs, respectively)

FIG. 15 shows an exemplary binary classification with sigmoid activation provided by one of the neural network architectures of FIG. 14A-14D. FIG. 15 illustrates classification based on the sigmoid function (top) with two possible probability density distributions PDF1 (middle graph) and PDF2 (lower graph). Values of the probability density functions PDF1 and PDF2 and the sigmoid activation function are shown in the range between −6 and +6. The probability density functions PDF1 and PDF2 take on values in the range between 0 and 0.6. The sigmoid activation function takes on values in the range between 0 and 1. When the data point from two classes are well separated from the value 0 (PDF1, middle graph), then the default threshold of 0.5 should be used (see top graph). If the distribution of the classes is overlapping (PDF2, bottom graph), then the decision threshold must be adapted to optimize the class attribution (see lower 'optimized threshold) in upper graph). Population associated with class 0 is represented by the dashed line and population associated with class 1 with the solid line.

The sigmoid activation will give the probability (y-axis) that the samples belongs to category 1 as a function of the weighted sum output (x-axis). By default, the decision threshold is set to 0.5, which works well to discriminate the populations in example 1 (PDF1). The distribution for both populations in not known in advance and decision threshold can be optimized to assign the class for each sample.

Figure 16:
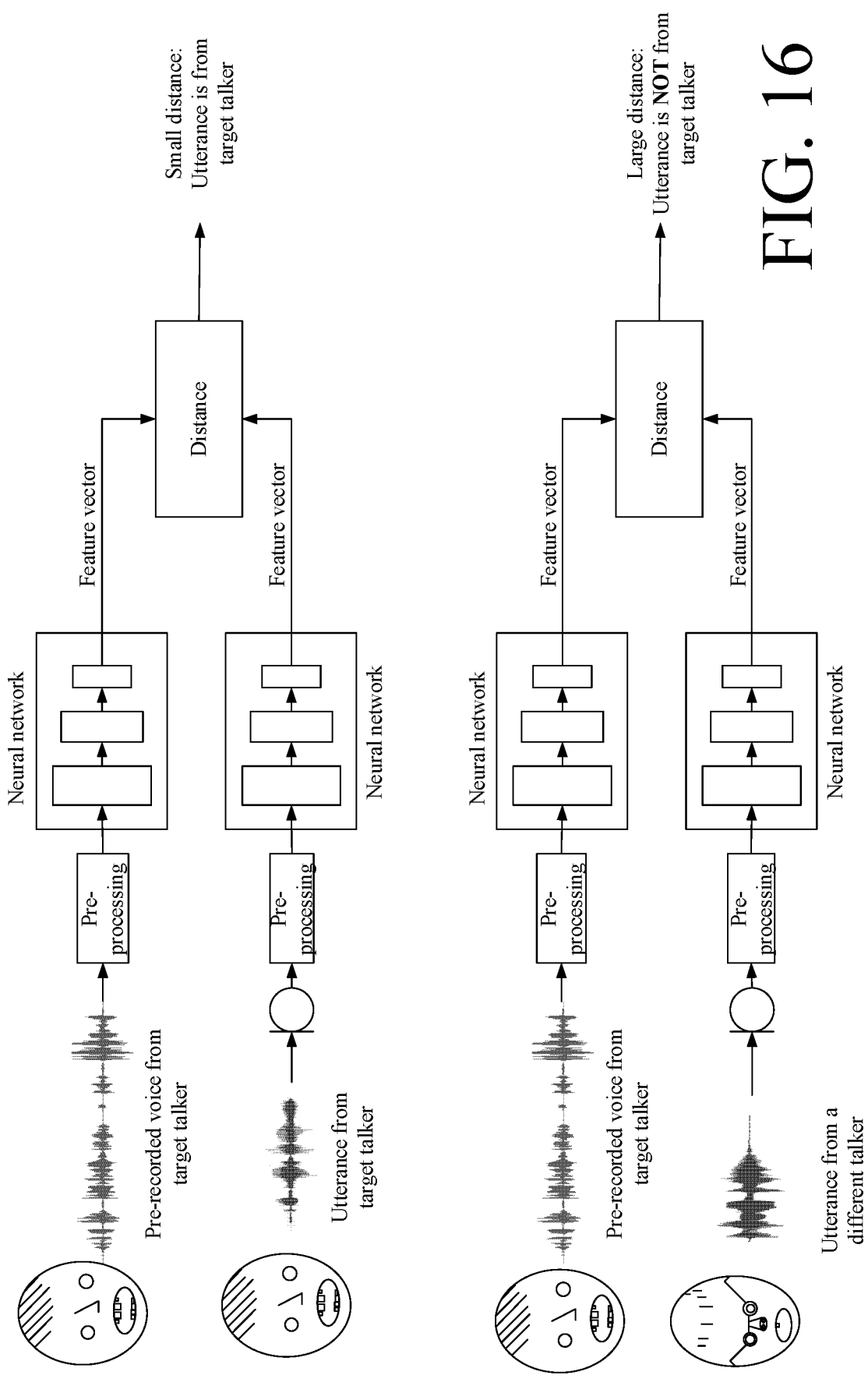
FIG. 16 illustrates a neural network of the siamese network-type, where no person specific training is involved (necessary).

FIG. 16 illustrates a neural network of the siamese network-type, where no person specific training is involved (necessary). FIG. 16 illustrates the principles of a siamese neural network. A Siamese neural network is pretrained such that its output is a feature vector, which has the following properties:

The distance between a feature vector of a pre-recorded voice of the target talker ('the particular user') and the estimated feature vector of another utterance of the same talker is small. This is illustrated in the upper part of FIG. 16.

The distance between a feature vector of a pre-recorded voice of the target talker and the estimated feature vector of an utterance of a different talker is large. This is illustrated in the lower part of FIG. 16. The feature vectors have been estimated using identical neural networks.

Preferably, the neural network is pre-trained based on many different utterances from many different talkers in advance such that the neural network does not have to be trained to the current target talker. Ideally, the distance between feature vectors should not depend on the background noise level, the level or talking-speed of the talker as well as the content of the utterance.

During the calibration routine of the hearing device, the feature vector of the pre-recorded target talker is estimated and stored in the hearing instrument. The distance between the stored feature vector and the currently measured distance vector is thus estimated on a continuous basis. E.g. when own voice has been detected or with a certain time interval.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCES

US20150230036A1 (Oticon) 13 Aug. 2015
  Our co-pending European patent application no. 18179374.6 having the title 'A hearing device comprising an acoustic event detector' (Oticon) filed with the European Patent Office on 22 Jun. 2018, published as EP3588981A1 on 1 Jan. 2020.
[Brandstein & Ward; 2001] Michael Brandstein & Darren Ward (Eds.), 'Microphone Arrays, Signal Processing Techniques and Applications', Springer Verlag, New-York (2001).
EP3328097A1 (Oticon) 30 May 2018
[Chollet & Allaire, 2018], Chollet, F. & Allaire J. J., 'Deep learning' with R. Manning Publications Co., Greenwich, Conn., USA (2018).

The invention claimed is:

1. A hearing system comprising
  a hearing device configured to be worn by a particular user at or in an ear, or to be partially implanted in the head at an ear of said particular user, the hearing device comprising
    at least one microphone for converting a sound in an environment of the hearing device to an electric input signal,
  a processor comprising
    an own voice analyzer configured to characterize the voice of a person presently wearing the hearing device based at least partly on said electric input signal, and to provide characteristics of the voice of said person presently wearing the hearing device, and
    an own voice acoustic channel analyzer for estimating characteristics of an acoustic channel from the mouth of said person presently wearing the hearing device to the at least one microphone based at least partly on said electric input signal, and to provide characteristics of said acoustic channel of said person presently wearing the hearing device,
  wherein the hearing system comprise a user identification unit configured to provide a user identification signal indicating whether or not, or with what probability, said person presently wearing the hearing device is said particular user in dependence of said characteristics of a voice of said person presently wearing the hearing device and said characteristics of said acoustic channel of said person presently wearing the hearing device.

2. The hearing system according to claim 1 wherein said user identification unit is configured to determine whether or not or with what probability the voice of said person presently wearing the hearing device matches a voice of said particular user and to provide a voice identifier indicative thereof.

3. The hearing system according to claim 1 wherein said user identification unit is configured to determine whether or not or with what probability the acoustic channel of said person presently wearing the hearing device matches the acoustic channel of said particular user and to provide an acoustic channel identifier indicative thereof.

4. The hearing system according to claim 1 wherein said detection of the voice of said person presently wearing the hearing device is based on a known placement of the at least one microphone relative to a mouth of said particular user.

5. The hearing system according to claim 1 wherein said detection of the voice of said person presently wearing the hearing device is based on or influenced by additional information.

6. The hearing system according to claim 5, further comprising a feedback estimation unit for providing an estimate of a current feedback path from an output transducer of the hearing device to said at least one microphone, said estimate of a current feedback being provided in relation to said person presently wearing the hearing device, wherein said additional information comprises or is derived from said estimate of a current feedback path.

7. The hearing system according to claim 1 wherein the own voice analyzer and/or the own voice acoustic channel analyzer comprises a neural network.

8. The hearing system according to claim 7 wherein the neural network has been trained on examples of a voice of said particular user while the hearing device is being configured to be worn by said particular user.

9. The hearing system according to claim 7 wherein the neural network comprises a Siamese network to learn voice features for people's voices, such that a distance measure between the voice features of different persons increases relative to the distance between voice features of a same person.

10. The hearing system according to claim 1 configured to be brought into an authorizing mode, when said user identification signal indicates a match with said particular user.

11. The hearing system according to claim 10 configured to stay in the authorizing mode until either 1) the user identification signal does not indicate a match with an identity of said particular user, or 2) until a request from said particular user is received by the hearing system, or 3) until a particular termination criterion is fulfilled, or a combination thereof.

12. The hearing system according to claim 11 wherein said particular termination criterion is related to an estimate of a current feedback path of the hearing device made in relation to said person presently wearing said hearing device.

13. The hearing system according claim 10 configured to enable or disable functionality of the hearing device in dependence of being in said authorizing mode.

14. The hearing system according to claim 13 wherein the hearing device is one of first and second hearing devices adapted for being located at or in first and second ears, respectively, of said particular user, each of the first and second hearing devices comprising at least one microphone.

15. The hearing system according to claim 1 wherein the hearing device is constituted by or comprises a hearing aid, a headset, an earphone, an ear protection device or a combination thereof.

16. The hearing system according to claim 1 comprising at least two microphones for providing at least two electric input signals.

17. The hearing system according to claim 16 comprising a directional microphone system for providing at least one beamformer based on predetermined or adaptively updated own voice filter weights, wherein an estimate of a voice of said particular user is provided in dependence of en-said own voice filter weights and said at least two electric input signals.

18. A method for biometric identification of a particular user comprising:
configuring a hearing device to be worn by said particular user, said hearing device comprising at least one microphone for converting a sound in an environment of the hearing device to an electric input signal; and
using a processor to
characterize the voice of a person presently wearing the hearing device based at least partly on said electric input signal, and to provide characteristics of the voice of said person presently wearing the hearing device,
estimate characteristics of an acoustic channel from the mouth of said person presently wearing the hearing device to the at least one microphone based at least partly on said electric input signal, and to provide characteristics of said acoustic channel of said person presently wearing the hearing device,
provide a user identification signal indicating whether or not, or with what probability, said person presently wearing the hearing device is said particular user in dependence of said characteristics of a voice of said person presently wearing the hearing device and said characteristics of said acoustic channel of said person presently wearing the hearing device.

19. The method Use—according to claim 18, further comprising:
on the basis of the user identification signal, using the processor to
unlock or lock particular devices or services for said particular user based on the user identification signal, and
lock or unlock particular devices or services for other users than said particular user.

20. A hearing device adapted to a particular user and configured to provide a user identification signal indicating whether or not a person presently wearing the hearing device is said particular user, the hearing device comprising:
a processor configured to provide said identification signal based on a combination of 1) identification of characteristics of a voice of said particular user, and 2) identification of another parameter characteristic of said person presently wearing the hearing device, wherein said another parameter characteristic of said person presently wearing the hearing device comprises an acoustic transfer function or impulse response,
wherein said acoustic transfer function or impulse response is
from a mouth to one or more microphones of the hearing device, and/or
from a loudspeaker to one or more microphones of the hearing device.

* * * * *